United States Patent
Basu et al.

(10) Patent No.: US 8,229,779 B2
(45) Date of Patent: Jul. 24, 2012

(54) METHOD AND SYSTEM FOR WORKFLOW MANAGEMENT OF A BUSINESS PROCESS

(75) Inventors: Sumanta Basu, Bangalore (IN); Abhishek Shukla, Allahabad (IN); Amit Vikram, Bangalore (IN); Arundat M Dasari, Bangalore (IN)

(73) Assignee: Wipro Limited, Bangalore, Karnataka (IN)

(*) Notice: Subject to any disclaimer, the term of this patent is extended or adjusted under 35 U.S.C. 154(b) by 288 days.

(21) Appl. No.: 12/636,803

(22) Filed: Dec. 14, 2009

(65) Prior Publication Data

US 2011/0145031 A1 Jun. 16, 2011

(51) Int. Cl.
*G06Q 10/00* (2006.01)

(52) U.S. Cl. .................... 705/7.27; 705/7.11

(58) Field of Classification Search ......... 705/7.11–7.42
See application file for complete search history.

(56) References Cited

U.S. PATENT DOCUMENTS

| | | | |
|---|---|---|---|
| 7,379,978 B2* | 5/2008 | Anderson et al. | 709/219 |
| 7,519,589 B2* | 4/2009 | Charnock et al. | 1/1 |
| 7,546,304 B1* | 6/2009 | Doughty | 1/1 |
| 7,558,793 B1* | 7/2009 | Topolovac et al. | 1/1 |
| 2005/0080651 A1* | 4/2005 | Morrison et al. | 705/2 |
| 2005/0203943 A1* | 9/2005 | Su et al. | 707/102 |
| 2007/0055597 A1* | 3/2007 | Patel et al. | 705/35 |
| 2007/0271160 A1* | 11/2007 | Stone et al. | 705/30 |
| 2008/0109188 A1* | 5/2008 | Nakagawa et al. | 702/188 |
| 2010/0306779 A1* | 12/2010 | Yengulalp et al. | 718/103 |

OTHER PUBLICATIONS

Rupa Krishnan, Lalitha Munaga, Kamalakar Karlapalem, XDoC-WFMS: A Framework for Document Centric Workflow Management System, Revised Papers from the HUMACS, DASWIS, ECOMO, and DAMA on ER 2001 Workshops, p. 348-362, Nov. 27-30, 2001.*

* cited by examiner

*Primary Examiner* — Jason Dunham
*Assistant Examiner* — Richard Scheunemann
(74) *Attorney, Agent, or Firm* — Prakash Nama; Global IP Services, PLLC

(57) ABSTRACT

A method and system for workflow management in a business process environment is disclosed. In one embodiment, a method includes determining respective attributes of a plurality of business documents received via an input device of the computing device, and receiving a set of business rules associated with the plurality of business documents. The set of business rules are based on the attributes of the plurality of business documents. The method also includes forming a plurality of queue filters for segregating a set of transactions associated with the plurality of business documents based on the set of business rules, and forming a plurality of queues based on the plurality of queue filters and at least one activity associated with the set of transactions. Further, the method includes generating on a display of the computing device, a list of agents assigned for each of the plurality of queues.

20 Claims, 20 Drawing Sheets

| TRANSACTION NO. 602 | TYPE 604 | INVOICE VALUE (IN $) 606 | ACTIVITIES 608 |
|---|---|---|---|
| T1 | PO | 1400 | DATA EXTRACTION, PO VALIDATION, VENDOR VALIDATION |
| T2 | PO | 1200 | DATA EXTRACTION, PO VALIDATION, VENDOR VALIDATION |
| T3 | NON-PO | 850 | DATA EXTRACTION, VENDOR VALIDATION |
| T4 | PO | 900 | DATA EXTRACTION, PO VALIDATION, VENDOR VALIDATION |
| T5 | NON-PO | 3000 | DATA EXTRACTION, VENDOR VALIDATION |
| T6 | PO | 3500 | DATA EXTRACTION, PO VALIDATION, VENDOR VALIDATION |
| T7 | NON-PO | 1600 | DATA EXTRACTION, VENDOR VALIDATION |
| T8 | PO | 1800 | DATA EXTRACTION, PO VALIDATION, VENDOR VALIDATION |
| T9 | NON-PO | 2800 | DATA EXTRACTION, VENDOR VALIDATION |
| T10 | NON-PO | 1250 | DATA EXTRACTION, VENDOR VALIDATION |

FIG. 6

|  | BINARY DATA FIELD 1204 | | CONTINUOUS DATA FIELD (INVOICE VALUE) 1206 | | | DISCRETE DATA FIELD (ORIGIN COUNTRY) 1208 | | |
|---|---|---|---|---|---|---|---|---|
| QUEUE NUMBER 1202 | PO | STRATEGIC | $100 | $200 | $300 | US | UK | IND |
| 1 | 1 | 1 | 1 | 0 | 0 | 1 | 0 | 0 |
| 2 | 0 | 1 | 0 | 1 | 0 | 0 | 1 | 0 |
| 3 | 1 | 1 | 0 | 0 | 1 | 0 | 1 | 1 |
| 4 | 1 | 1 | 0 | 0 | 1 | 0 | 1 | 0 |
| 5 | 1 | 1 | 1 | 0 | 0 | 1 | 0 | 1 |

FIG. 12

| QUEUE NUMBER 1302 | BINARY DATA FIELD 1304 | | CONTINUOUS DATA FIELD (VALUE OF INVOICE) 1306 | | | DISCRETE DATA FIELD (ORIGIN COUNTRY) 1308 | | |
|---|---|---|---|---|---|---|---|---|
| | PO | STRATEGIC | $100 | $200 | $300 | US | UK | IND |
| 1 | 1 | 1 | 1 | 0 | 0 | 1 | 0 | 0 |

| QUEUE NUMBER 1302 | BINARY DATA FIELD 1304 | | CONTINUOUS DATA FIELD (VALUE OF INVOICE) 1306 | | | DISCRETE DATA FIELD (ORIGIN COUNTRY) 1308 | | |
|---|---|---|---|---|---|---|---|---|
| | PO | STRATEGIC | $100 | $200 | $300 | US | UK | IND |
| 1 | 1 | 1 | 1 | 0 | 0 | 1 | 0 | 0 |
| 2 | 0 | 1 | 0 | 1 | 0 | 0 | 1 | 0 |
| SCORE | 0 | 1 | 0 | 0 | 0 | 0 | 0 | 0 |

| | BINARY DATA FIELD 1304 | | CONTINUOUS DATA FIELD (VALUE OF INVOICE) 1306 | | | DISCRETE DATA FIELD (ORIGIN COUNTRY) 1308 | | |
|---|---|---|---|---|---|---|---|---|
| QUEUE NUMBER 1302 | PO | STRATEGIC | $100 | $200 | $300 | US | UK | IND |
| 1 | 1 | 1 | 1 | 0 | 0 | 1 | 0 | 0 |
| 2 | 0 | 1 | 0 | 1 | 0 | 0 | 1 | 0 |
| 3 | 1 | 1 | 0 | 0 | 1 | 0 | 1 | 1 |
| 4 | 1 | 1 | 0 | 0 | 1 | 0 | 1 | 0 |
| 5 | 1 | 1 | 1 | 0 | 0 | 1 | 0 | 1 |

1300C

MATCHING

FIG. 13C

METHOD AND SYSTEM FOR WORKFLOW MANAGEMENT OF A BUSINESS PROCESS

FIELD OF TECHNOLOGY

Embodiments of the present invention relate to the field of computer software. More particularly, embodiments of the present invention relate to workflow management in a business process environment.

BACKGROUND

Typically, in a business process outsourcing (BPO) scenario, a process execution may involve processing of large number of business documents (e.g., invoices, purchase orders, goods received notes, credit notes, checks, etc.). A business process may have one or more associated business documents, and two processes may share a business document. The business documents may be categorized into three types—input business documents (IBD), support business documents (SBD), and output business documents (OBD).

One or more of the input business documents may be needed to start a transaction. For example, an invoice is an input business document for an account payable (AP) process. One or more support business documents may be needed to complete later activities of the business process. For example, a purchase order (PO) may be necessary to validate the invoice. Output business documents may be generated after the completion of the business process.

Further, the input business documents may be characterized based on their business attributes and activities performed during their transactions. For example, in an accounts payable (AP) process for invoices, the business attributes may include business document type, vendor name, vendor address, invoice number, invoice date, purchase order number, invoice value, etc. Variations in the business documents may exist due to the differences in the business attributes. Further, the variations in the business documents may result in different sets of activities that need to be performed to process the transactions associated with the business documents. Further, these variations in the transactions may cause difficulties in tracking and managing the transactions, especially when the number of the transactions is large.

Another challenge faced in processing the business documents may be in allocation of resources for performing the activities associated with the transactions. Since the variations in the transactions calls for assigning activities to agents of different skill sets, allocating a work item associated with each transaction to an agent with required skill set (e.g., right work item to right agent) may become a challenging task in the BPO industry due to process variations and complexity.

Further, in the BPO industry, a customer may transfer a business responsibility to a BPO service provider. A contract may be formally created between the two parties and may include a negotiated agreement called a service level agreement (SLA). Common understandings about offered services of the BPO service provider, priorities, responsibilities, guarantees, and levels of service may be documented in the SLA. For example, the SLA may specify levels of availability, serviceability, performance, penalties, and other such attributes of service. Typically, specific SLA's may be negotiated up-front as part of outsourcing contract and may be utilized as a primary tool of outsourcing governance.

The BPO service provider, however, may have difficulty setting up, tracking, and managing the SLAs in case of complex processes which involve multiple forking and joining of transactions. Failure to comply with the SLAs may have adverse consequences. For example, financial penalties may be assessed for failure to adhere to the SLAs or the outsourced contract. Further, in case of multiple failures, the customer may terminate the outsourced contract.

SUMMARY

A method and system for workflow management of a business process is disclosed. According to one aspect of the invention, a method, implemented in a computing device, for workflow management of a business process includes determining respective attributes of a plurality of business documents received via an input device of the computing device, and receiving a set of business rules associated with the plurality of business documents. For example, the set of business rules are based on the attributes of the plurality of business documents. The method also includes forming a plurality of queue filters for segregating a set of transactions associated with the plurality of business documents based on the set of business rules.

The method further includes forming a plurality of queues based on the plurality of queue filters and at least one activity associated with the set of transactions. In addition, the method includes generating on a display of the computing device, a list of agents assigned for each of the plurality of queues. Furthermore, the method may include generating an alert message on the display of the computing device when one of the pluralities of queues is a superset or subset of another one of the plurality of queues. The method also includes deleting a currently created one of the two respective queues from a specified format (e.g., a table). The currently created one of the two respective queues is stored in a memory associated with the computing device as one of discarded queues.

Additionally, the method includes adding an additional data field to the table, restoring the discarded queues from the memory to the table, and determining an overlapping between a current set of queues in the table. Further, the method may include adding a new queue filter based on an additional business rule if an activity is added to the business process. The additional business rule is formed in response to the activity added to the business process. The method also includes performing the steps of forming the plurality of queues and generating on the display of the computing device, a list of agents based on the plurality of queue filters, the new queue filter, the at least one activity, and the activity added to the business process.

According to another aspect of the present invention, a non-transitory computer-readable medium having instructions that, when executed by a computer, cause the computer to perform the method for workflow management of the business process as described above.

According to yet another aspect of the present invention, an apparatus for workflow management of a business process includes a processor and a memory for temporarily storing a set of instructions. The instructions when executed by the processor, causes the processor to perform the method for workflow management of the business process as described above.

According to a further another aspect of the present invention, a computer network system includes a server and a plurality of clients. The server when requested by the clients for a service, causes the clients to perform the method for workflow management of the business process as described above.

According to yet a further aspect of the present invention, a system for workflow management of a business process includes a workflow module for managing workflow of a business process. The workflow module includes a queue filter module, an exclusive queue module, and a work allocation module. The workflow module determines respective attributes of a plurality of business documents. The queue filter module receives a set of business rules associated with the plurality of business documents. The set of business rules are based on the attributes of the plurality of business documents. Further, the queue filter module forms a plurality of queue filters for segregating a set of transactions associated with the plurality of business documents based on the set of business rules. Then, the exclusive queue module forms a plurality of queues based on the plurality of queue filters and at least one activity associated with the set of transactions. Moreover, the work allocation module assigns a list of agents for each of the plurality of queues.

The methods, systems, and apparatuses disclosed herein may be implemented in any means for achieving various aspects, and other features will be apparent from the accompanying drawings and from the detailed description that follow.

BRIEF DESCRIPTION OF THE DRAWINGS

Various preferred embodiments are described herein with reference to the drawings, wherein:

FIG. 6 illustrates a table showing transaction details associated with a business process, according to one embodiment;

FIG. 12 illustrates a table showing different fields used for defining queues, according to one embodiment;

FIG. 13A illustrates a tabular representation showing a queue formed, according to one embodiment;

FIG. 13B illustrates a table showing computation of a final score upon formation of two queues, according to one embodiment;

FIG. 13C illustrates a table showing overlapping queues, according to one embodiment;

The drawings described herein are for illustration purposes only and are not intended to limit the scope of the present disclosure in any way.

DETAILED DESCRIPTION

A method and system for workflow management of a business process is disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

The terms 'business process' and 'process' are used interchangeably throughout the document. Also, the terms 'business document attributes', 'business attributes' and 'attributes' are used interchangeably throughout the document.

Figure 1:
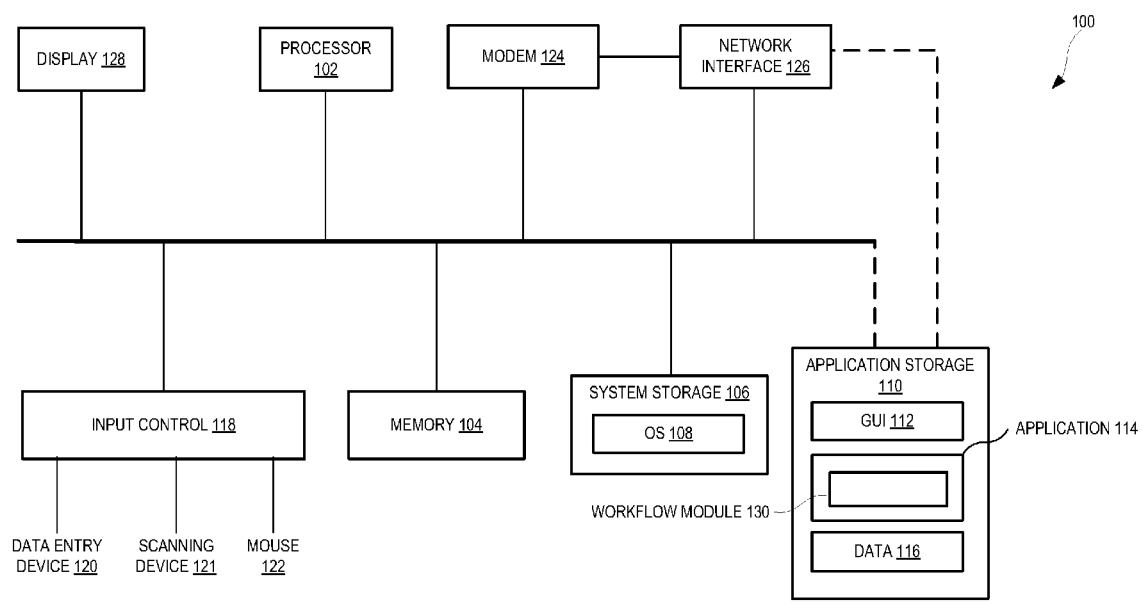
FIG. 1 illustrates an exemplary computing device operable for practicing various embodiments of the present invention.

FIG. 1 illustrates an exemplary computing device 100 operable for practicing various embodiments of the present invention. One of ordinary skill in the art will appreciate that the computing device 100 is intended to be illustrative and not limiting of the present invention. The computing device 100 may take many forms, including but not limited to a workstation, server, network computer, quantum computer, optical computer, bio-computer, Internet appliance, mobile device, pager, tablet computer, and the like.

The computing device 100 may be an electronic device and includes a processor 102, memory 104, a system storage 106 storing an operating system 108, an application storage 110 storing a graphical user interface (GUI) 112, an application 114 including a workflow module 130, data 116, an input control 118 for a data entry device 120, a scanning device 121, and a mouse 122, a modem 124, a network interface 126, a display 128, etc. The processor 102 controls each component of the computing device 100 to manage workflow of a business process based on queues.

For example, the business process is a collection of related, structured activities that produce a specific service or product for a particular customer(s). An example of the business process is an accounts payable (AP) process. An AP process is a process within a company's financial structure which identifies, captures and pays liabilities of a company. The AP process is a time-sensitive function and may lead to real costs (i.e., penalties to pay in time) as opportunity costs (i.e., failure to obtain discounts offered) to the company. The AP process may be divided into six steps, viz. invoice receipt and handling, invoice validation, vendor validation, enterprise resource planning (ERP) matching, exception management, and payment management.

The memory 104 temporarily stores instructions and data and provides the stored instructions and data to the processor 102 so that the processor 102 operates the computing device 100 to generate the queues and to manage the workflow based on the queues, e.g., using the workflow module 130. The system storage 106 includes code for the OS 108 of the computing device 100. The application storage 110 includes a set of instructions for the application 114 running on the OS 108 which generates the queues and manages the workflow of the business process based on the queues as well as the data 116 associated with the queues. In one example implementation, the system storage 106 and the application storage 110 may be implemented using a single storage. In another example implementation, the GUI 112, the application 114, and the data 116 may be stored in different storage devices.

The input control 118 may interface with a data entry device 120, a scanning device 121, a mouse 122, and other input devices. The computing device 100 may receive, through the input control 118, input data necessary for forming the queues. The computing device 100 may display user interfaces in the display 128 for users to form the queues and manage the workflow. Moreover, the application storage 110 may interface with the computing device 100 directly with the bus of the computing device 100 or via the network interface 126.

In one embodiment, the computing device 100 or an apparatus for workflow management of the business process includes the processor 102 and the memory 104 for temporarily storing a set of instructions. The set of instructions, when executed by the processor 102, causes the processor 102 to perform a method including determining respective attributes of a plurality of business documents received via an input device of the computing device 100. In one embodiment, the input device of the computing device 100 includes the data entry device 120 and the scanning device 121. The data entry device 120 is operable to process the attributes of the plurality of business documents when the attributes of the plurality of business documents are manually entered. The scanning device 121 is operable to read the plurality of business documents in a specified format such as an extensible markup language (XML) format.

The method also includes receiving a set of business rules associated with the plurality of business documents, where the set of business rules are based on the attributes of the plurality of business documents. The method further includes forming a plurality of queue filters for segregating a set of transactions associated with the plurality of business documents based on the set of business rules. For example, a transaction is an instance of the business process. The business process may include a set of transactions that are performed by an agent(s). For an AP process, a set of transactions may include processing of purchase orders and/or non-purchase orders. Further, the purchase orders and the non-purchase orders may have attributes such as invoice value, origin country, language used, vendor type and like. As described above, the set of transactions are segregated based on the set of business rules, where each business rule is based on the attributes. Moreover, the method includes forming a plurality of queues based on the plurality of queue filters and at least one activity associated with the set of transactions. In addition, the method includes generating on the display 128 of the computing device 100, a list of agents assigned for each of the plurality of queues.

Figure 2A:
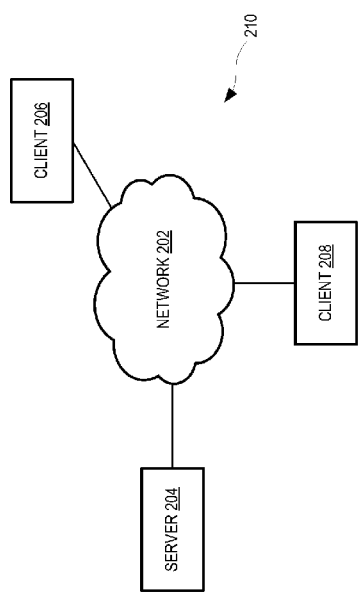
FIG. 2A illustrates an exemplary network environment or system operable for practicing various embodiments of the present invention.

FIG. 2A illustrates an exemplary network environment 210 or system operable for practicing various embodiments of the present invention. The network environment 210 may include a server 204 coupled to clients 206 and 208 via a network 202 (e.g., a communication network). The server 204 and the clients 206 and 208 can be implemented using the computing device 100 depicted in FIG. 1.

The network interface 126 and the modem 124 of the computing device 100 enable the server 204 to communicate with the clients 206 and 208 through the network 202. The network 202 may include Internet, intranet, Local Area Network (LAN), Wide Area Network (WAN), Metropolitan Area Network (MAN), etc. The communication facilities can support the distributed implementations of the present invention.

In the network environment 210, the server 204 may provide the clients 206 and 208 with software components or products under a particular condition, such as a license agreement. The software components or products may include those for generating the queues and managing the workflow of the business process as illustrated in FIG. 1. The server 204 may send the clients 206 and 208 the software components or products under a specific license agreement.

Figure 2B:
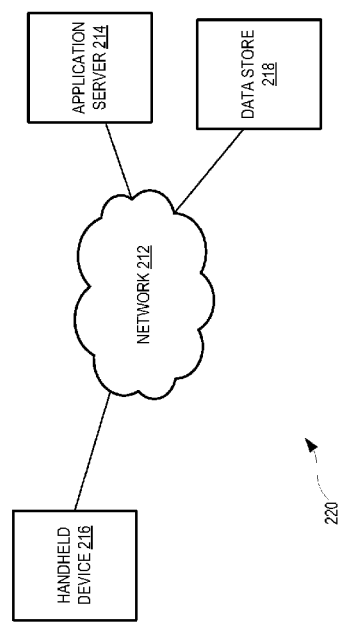
FIG. 2B illustrates an exemplary handheld device working in an exemplary network environment, according to one embodiment.

FIG. 2B illustrates an exemplary handheld device 216 working in an exemplary network environment 220, according to one embodiment. The network environment 220 may include an application server 214 coupled to the handheld device 216 via a network 212. The application server 214 and the handheld device 216 can be implemented using the computing device 100 depicted in FIG. 1.

The network interface 126 and the modem 124 of the computing device 100 enable the application server 214 to communicate with the handheld device 216 through the network 212. In one embodiment of the network environment 220, the handheld device 216 may be configured to run the application 114 independently if the handheld device 216 is equipped with the application storage 110 that includes the GUI 112, the application 114 having the workflow module 130 and the data 116.

In another embodiment of the network environment 220, the handheld device 216 may be configured to run the application 114 using the data 116 residing in a data store 218 via the network 212 if the handheld device 216 is equipped with an application storage that includes the GUI 112 and the application 114. In yet another embodiment of the network environment 220, the handheld device 216 may be configured to run the application 114 serviced by the application server 214 using the data 116 stored in the data store 218 via the network 212 if the handheld device 216 is equipped with the GUI 112 only.

Figure 3:
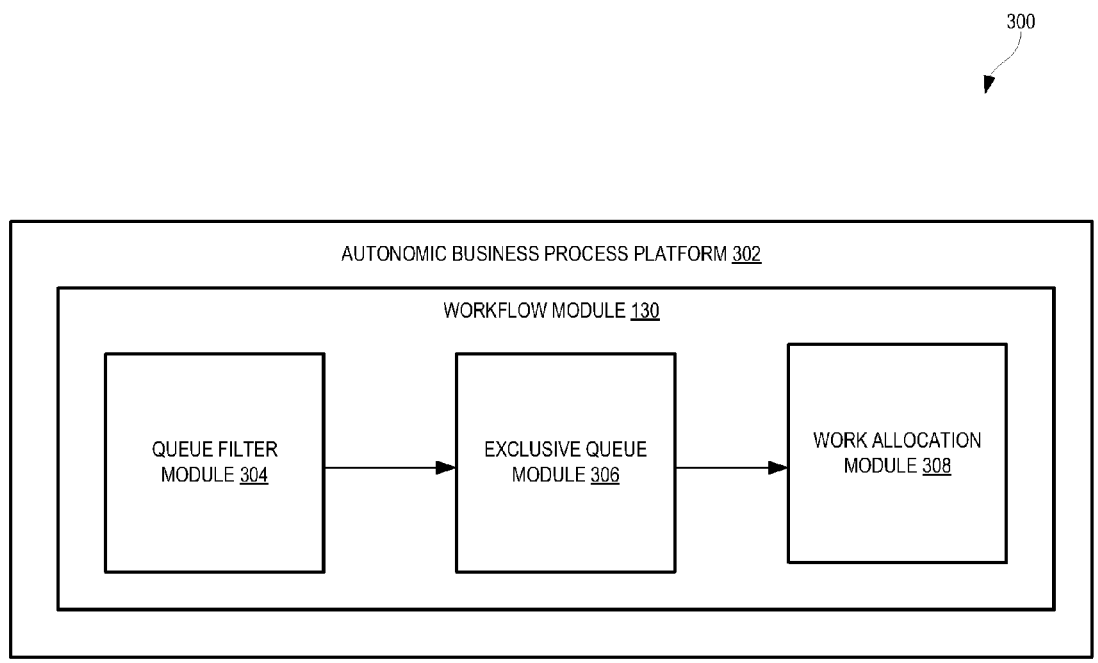
FIG. 3 illustrates a block diagram 300 of an autonomic business process platform having the workflow module of FIG. 1, according to one embodiment.

FIG. 3 illustrates a block diagram 300 of an autonomic business process platform 302 having the workflow module 130 of FIG. 1, according to one embodiment. The autonomic business process platform 302 is a goal oriented system configured to proactively achieve business objectives such as cost reduction and productivity enhancement goals. The autonomic business process platform 302 is configured to autonomously achieve optimal and efficient resource allocation by dynamic mapping of agent attributes with business process complexity. In FIG. 3, the autonomic business process platform 302 includes the workflow module 130. The workflow module 130 includes a queue filter module 304, an exclusive queue module 306 and a work allocation module 308.

Consider that, multiple business documents are received via the scanning entry device 121 of the computing device 100 for performing a set of transactions associated with a business process. In one example embodiment, the workflow module 130 determines respective attributes (e.g., document type, invoice value, etc.) of the multiple business documents (e.g., in a pre-indexing stage). In one exemplary operation, the queue filter module 304 receives a set of business rules associated with the multiple business documents based on the respective attributes. Further, the queue filter module 304 forms queue filters for segregating the set of transactions associated with the multiple business documents based on the set of business rules.

The exclusive queue module 306 then forms queues based on the queue filters formed and activities associated with the set of transactions. In one embodiment, the exclusive queue module 306 forms the queues without an overlapping between the queues. The work allocation module 308 assigns one or more agents to each of the queues based on skill set and proficiency level of one or more agents. Also, the work allocation module 308 displays a list of agents assigned to each of the queues on the display 128 of the computing device 100. Further, the one or more agents can acquire jobs from the associated queue. The various other modules of the workflow module 130 involved in managing workflow in the business process are described in FIG. 4.

Figure 4:
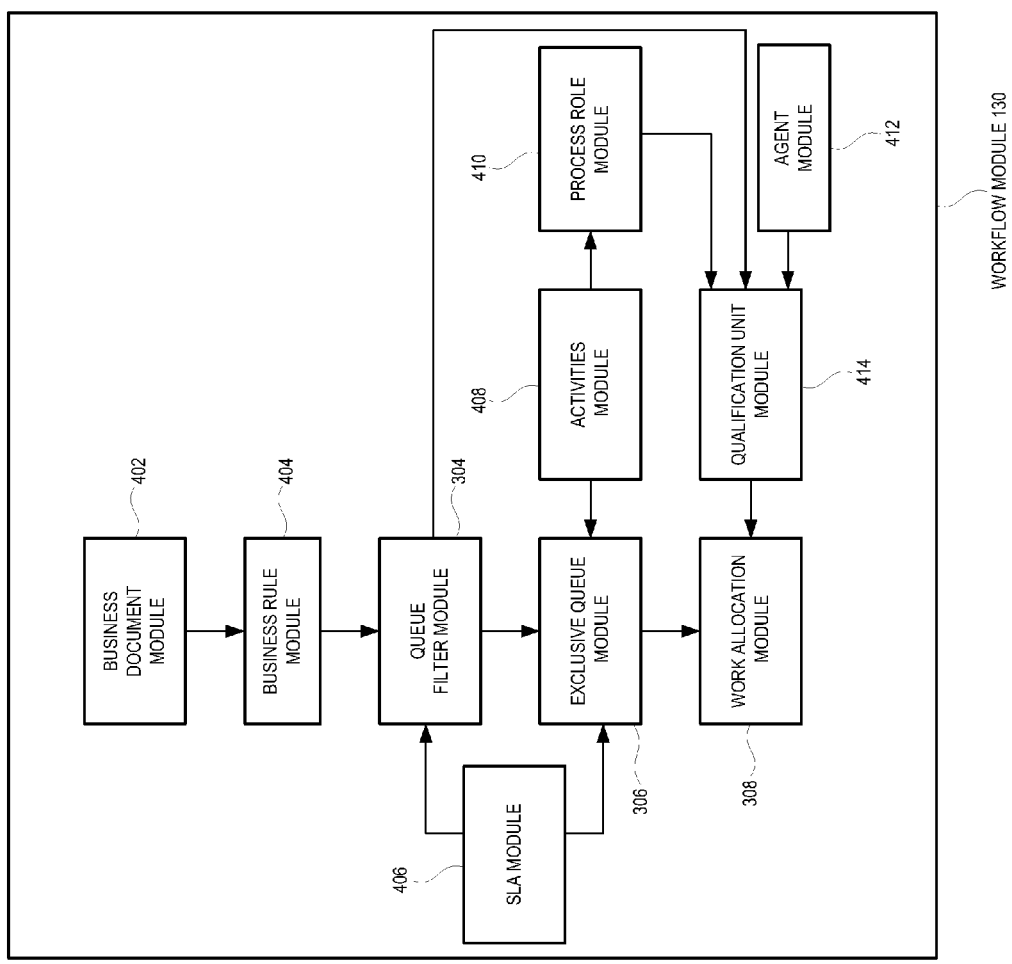
FIG. 4 illustrates a schematic representation of various modules associated with the workflow module which enables managing of workflow in a business process, according to one embodiment.

FIG. 4 illustrates a schematic representation of various modules associated with the workflow module 130 which enables managing of workflow in the business process, according to one embodiment. In FIG. 4, the workflow module 130 includes a business document module 402, a business rule module 404, the queue filter module 304, the exclusive queue module 306, the work allocation module 308, a SLA module 406, an activity module 408, a process role module 410, an agent module 412, and a qualification unit module 414.

A business document module 402 may receive business documents associated with a set of transactions of a business process from a user of the computing device 100. In one embodiment, the business documents associated with the set of transactions in the business process are received via the input devices such as the data entry device 120, the scanning device 121, and other input devices. For example, the business documents received via the input devices may include input business documents and support business documents. The business document module 402 may then provide the received business documents to the business rule module 404. The business rule module 404 may extract business attributes associated with each of the business documents and create a set of business rules based on the business attributes. For example, the business attributes may include attributes such as an input document type, a vendor type, an origin country, a language used, and a value of invoice.

The queue filter module 304 may receive the set of business rules from the business rule module 404. The queue filter module 304 may create a plurality of queue filters for segregating the set of transactions associated with the business documents based on the set of business rules. In case of invoice processing, the queue filter module 304 may create the queue filters as QF1: non-PO and invoice value >$300 and QF2: PO and invoice value <=$300. In the queue filter QF1, a first component which is the business document may be an invoice and a second component which is the business rule may include a PO number as blank and an invoice value more than $300.

Figure 9:
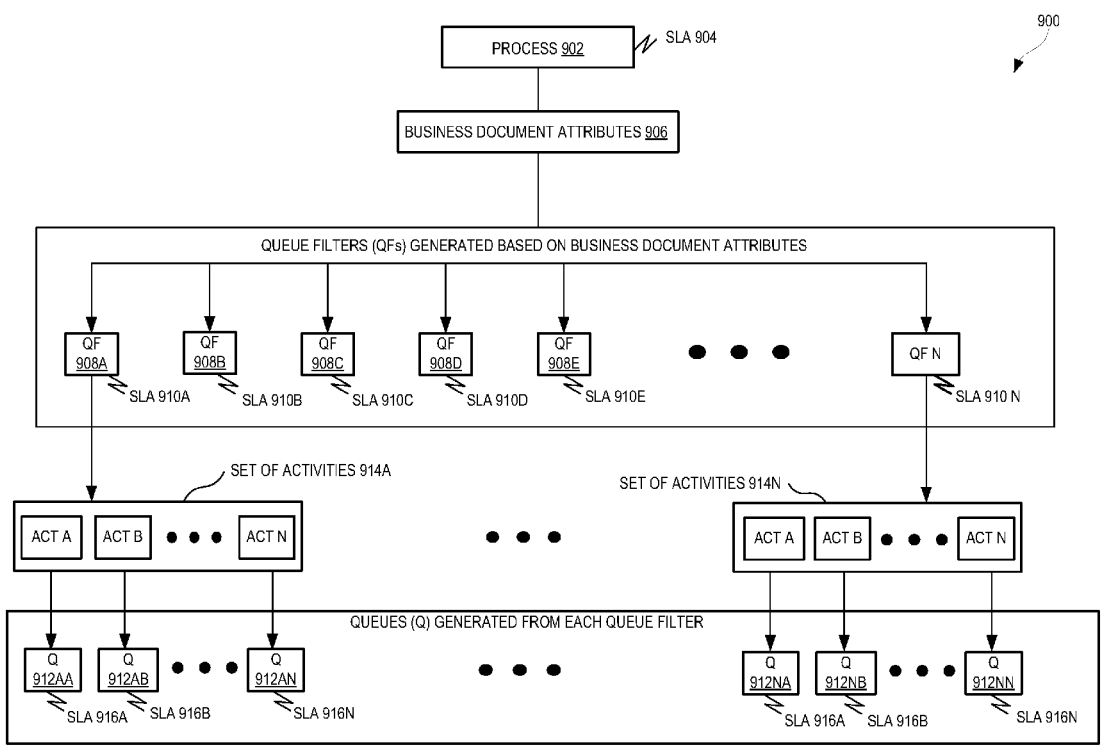
FIG. 9 illustrates a schematic representation of association of SLAs in different levels within a business process, according to one embodiment.

As illustrated in FIG. 4, the SLA module 406 may assign SLAs to each of the queue filters created by the queue filter module 304, as will be illustrated in FIG. 9. For example, say for a particular transaction associated with a strategic vendor having an invoice value greater $5000 and turn-around-time (TAT) of 4 days, a SLA assigned to a queue filter may include a TAT of 3 days (instead of 4 days) as the customer is a strategic vendor and the invoice value is also high. It can be noted that, execution of the transaction to adhere to the defined SLA may enhance customer satisfaction and may also increase volume of transactions. Thus, associating of the SLA with the queue filter based on the business rule helps adhere to the SLA and efficient execution of the business process.

The exclusive queue module 306 may then form a plurality of queues based on the plurality of queue filters and activities associated with the set of transactions. In one embodiment, the exclusive queue module 306 may form the plurality of queues in such a way that there is no overlapping between any two or more queues in the plurality of queues. The activity module 408 may provide information associated with the activities of the set of transaction used in forming the plurality of queues.

The SLA module 406 may assign a SLA to each of the plurality of queues formed as will be illustrated in FIG. 9. In one embodiment, the SLAs are assigned to each of the plurality of queues based on the set of business rules and an associated activity. The process role module 410 may provide information associated with various process roles associated with various activities in the business process. A process role represents the set of activities for which the agent has the eligibility to work on a particular work item. It can be noted that, each agent is associated with one or more process roles in the business process.

The agent module 412 may provide information related to agents capable of performing work items associated with the business process. For example, the agent information may be based on a process specific experience and a general skill-set. The process specific experience information may include information associated with experience of an agent in a particular domain, duration of stay in an organization or in a team, etc. The general skill-set information may include information related to agent's educational background, performance appraisal in other organizations, previous work experience, etc. The qualification unit module 414 may receive process role information from the process role module 410, agent information from the agent module 412 and queue filter information from the queue filter module 304.

Based on the received information, the qualification unit module 414 may associate the agents to one or more process roles and one or more queue filters. In one example embodiment, the qualification unit module 414 associates the agents to the one or more queue filters to classify the agents in terms of activities they can perform and the level of transactions in terms of complexity or importance. Further, the qualification unit module 414 provides the association information to the work allocation module 308 for assigning queues to the agents based on the associated information.

Further, based on the plurality of queues and the association information, the work allocation module 308 may allocate work items pertaining to the plurality of queues to one or more agents associated with the process role. It is appreciated that, the work items are allocated to the agents using any of work allocation methods including but not limited to an open allocation method, a rules based allocation method and a manual allocation method which are well known to a person skilled in the art. Further, the work allocation module 308 may output a list of agents assigned to each of the plurality of queues on the display 128 of the computing device 100. Thus, in the manner described above, the workflow module 308 facilitates managing of workflow in the business process.

Figure 5:
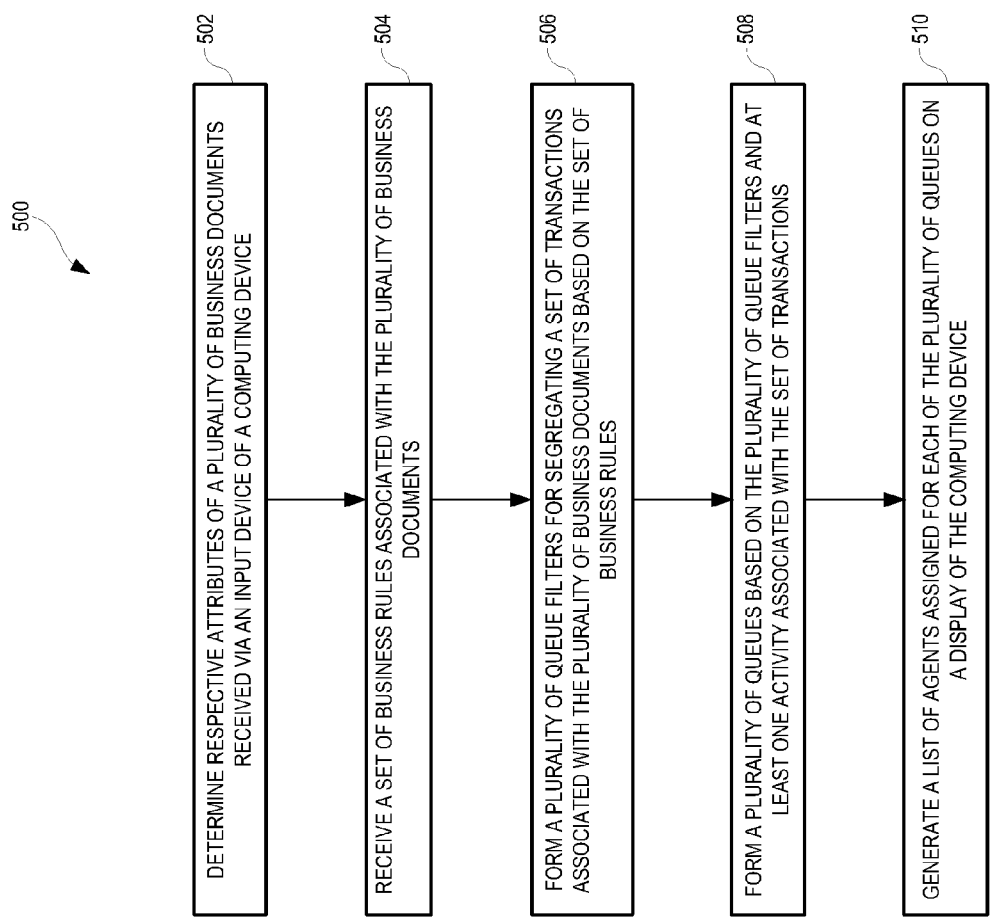
FIG. 5 illustrates a process flow chart of an exemplary method of managing of a workflow in a business process, according to one embodiment.

FIG. 5 illustrates a process flow chart of an exemplary method 500 of managing of a workflow in a business process, according to one embodiment. In operation 502, respective attributes of a plurality of business documents received via an input device of a computing device are determined. In operation 504, a set of business rules associated with the plurality of business documents are received. The set of business rules are based on the attributes of the plurality of business documents.

In operation 506, a plurality of queue filters are formed for segregating a set of transactions associated with the plurality of business documents based on the set of business rules. In operation 508, a plurality of queues is formed based on the plurality of queue filters and at least one activity associated with the set of transactions. In operation 510, a list of agents assigned for each of the plurality of queues is generated on a display of the computing device. Moreover, in one embodiment, a non-transitory computer-readable storage medium having instructions that, when executed by a computing device, cause the computing device to perform the method illustrated in FIG. 5.

FIG. 6 illustrates a table 600 showing transaction details associated with a business process, according to one embodiment. In one example embodiment, the business process may be an accounts payable process. As illustrated, the table 600 includes a transaction number column 602, a type column 604, an invoice value in dollar column 606 and an activities column 608. The table 600 also displays 10 transactions associated with the accounts payable process. According to an embodiment of the present invention, the 10 transactions may be segregated into queues based on queue filters to enable workflow functionality. Each queue filter may be defined based on an input document type (e.g., PO or non-PO) and a value of invoice.

The input document type is entered in the type column 604 and the value of invoice is entered in the invoice value (in dollar) column 606. The input document type includes a data field of binary nature whereas the value of invoice includes a data field of continuous nature. As illustrated in FIG. 6, the type column 604 shows that business document associated with transactions T1, T 2, T4, T6 and T8 is PO invoice, while the business document associated with transactions T3, T5, T7, T9 and T10 is non-PO invoice. Also, activities associated with each transaction are entered in the activities column 608. The activities include data extraction activity, PO validation activity, vendor validation activity, and the like.

Figure 7:
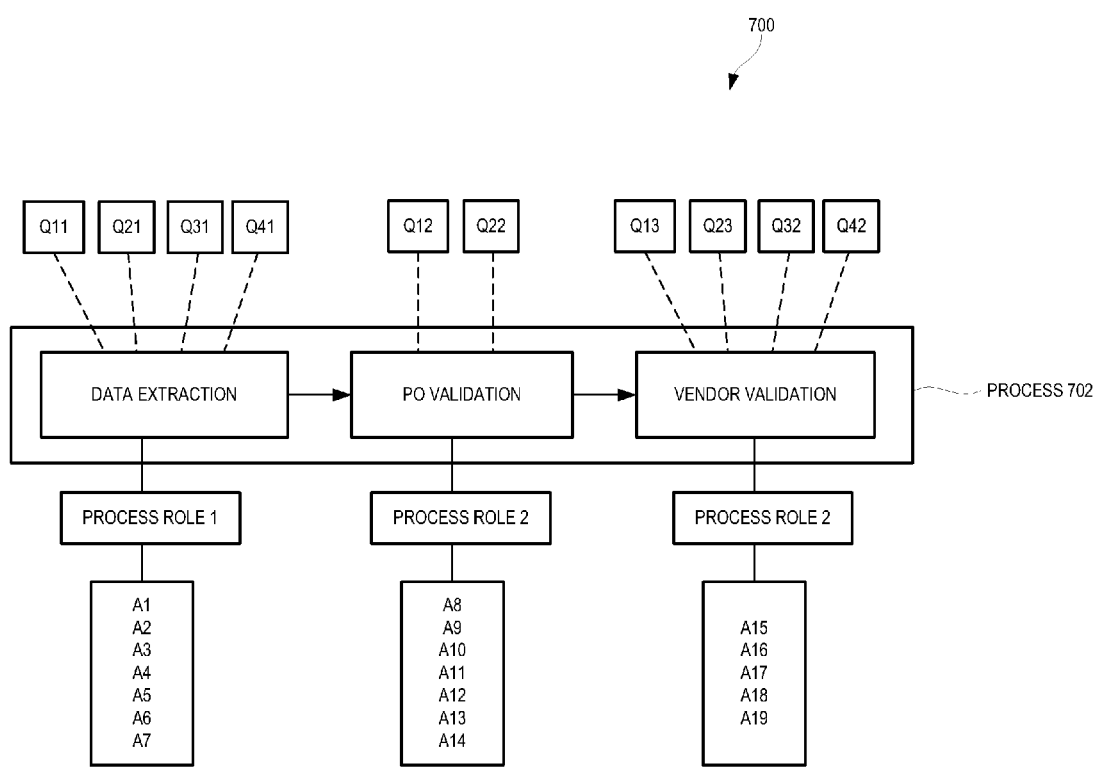
FIG. 7 illustrates an exemplary flow diagram showing formation of queues and allocation of work items to agents based on the queues formed, according to embodiment.

FIG. 7 illustrates an exemplary flow diagram 700 showing formation of queues and allocation of work items to agents based on the queues formed, according to embodiment. In one example embodiment, the queue filters formed (e.g., by the queue filter module 304) for the 10 transactions in the table 600 include QF1: PO with invoice value <=1500, QF2: PO with invoice value >1500, QF3: non-PO with invoice value <=1500 and QF4: non-PO with invoice value >1500. From the table 600, the transactions are segregated based on the queue filter as QF1-T1, T2 and T4, QF2-T6 and T8, QF3-T3, T7 and T10, and QF4-T5 and T9.

The set of transactions grouped under each queue filter may require one or more activities, associated with a process 702, to be performed to complete the transactions. Accordingly, one or more queues are formed based on a queue filter and a number of activities associated with a set of transactions belonging to the queue filter (e.g., by the exclusive queue module 306). Each queue includes a name of the business process, a name of the input document, one of the set of business rules, and a name of the at least one activity. Thus, queues formed based on the queue filter QF1 and activities associated with the transactions T1, T2 and T4 are: Q11: QF1+data extraction activity, Q12: QF1+PO validation activity and Q13: QF1+vendor validation activity.

Similarly, queues formed based on the queue filter QF2 and activities associated with the transactions T6 and T8, are: Q21: QF2+data extraction activity, Q22: QF2+PO validation activity and Q23: QF2+vendor validation activity. Further, queues formed based on the queue filter QF3 and activities associated with the transactions T3, T7 and T10 are: Q31: QF3+data extraction activity and Q32: QF3+vendor validation activity. In a similar manner, queues formed based on the queue filter QF4 and activities associated with the transactions T5 and T9 are: Q41: QF4+data extraction activity and Q42: QF4+vendor validation activity.

Based on the above queues created, a work item(s) for performing an activity associated with each transaction is allocated to an agent(s) (e.g., by the work allocation module 308). It can be seen from FIG. 7 that, the queues Q11, Q21, Q31, and Q41 are associated with the data extraction activity, the queues Q12 and Q22 are associated with the PO validation activity and the queues Q13, Q23, Q32, and Q42 are associated with a vendor validation activity. Also, as illustrated in FIG. 7, agents A1-A7 are associated with a process role 1 which is associated with the data extraction activity. This implies that, the agents A1-A7 are eligible for working on the data extraction activity to which the process role 1 is associated.

The agents A1-A7 associated with the process role 1 may have different skill sets. Also, specific skill sets may be required for performing the data extraction activity. For example, consider that, the agents A1, A3 and A5 are eligible to perform the data extraction activity associated with the PO invoice while the agents A2, A4, A6 and A7 are eligible to perform the data extraction activity associated with the non-PO invoice.

In case of the data extraction activity for the PO invoice, suppose, the agent A3 is having a higher qualification and a good experience in performing the data extraction activity as compared to other agents A1 and A5 associated with the process role 1. Then, the work items associated with the queue Q21 are allocated to the agent A3 as the transactions (T6 and T8) associated with the queue Q21 are having an invoice value >$1500. Other work items associated with the queue Q11 can be allocated to the agents A1 and A5 as the transactions (T1, T2 and T4) associated with the queue Q11 are having an invoice value <=$1500.

Similarly, in case of the data extraction activity for the non-PO invoice, suppose, the agents A2 and A7 are having good experience in performing the data extraction activity as compared other agents A4 and A6 associated with the process role 1. Then, the work items associated with the queue Q41 are allocated to the agents A2 and A7 as the transactions (T5 and T9) associated with the queue Q41 are having an invoice value >$1500. Other work items associated with the queue Q31 may be allocated to the agents A2 and A6 as the transactions (T3, T7 and T10) associated with Q31 are having an invoice value <=$1500.

The same thing holds good for the PO validation activity and the vendor validation activity of the process 702 shown above. It can be noted that, the transactions are tracked based on the queues Q11, Q12, Q13, Q21, Q22, Q23, Q31, Q32, Q41, and Q42. Further, the queues Q11, Q12, Q13, Q21, Q22, Q23, Q31, Q32, Q41, and Q42 facilitate allocation of the work items to most eligible agent among a group of agents associated with a process role.

Figure 8:
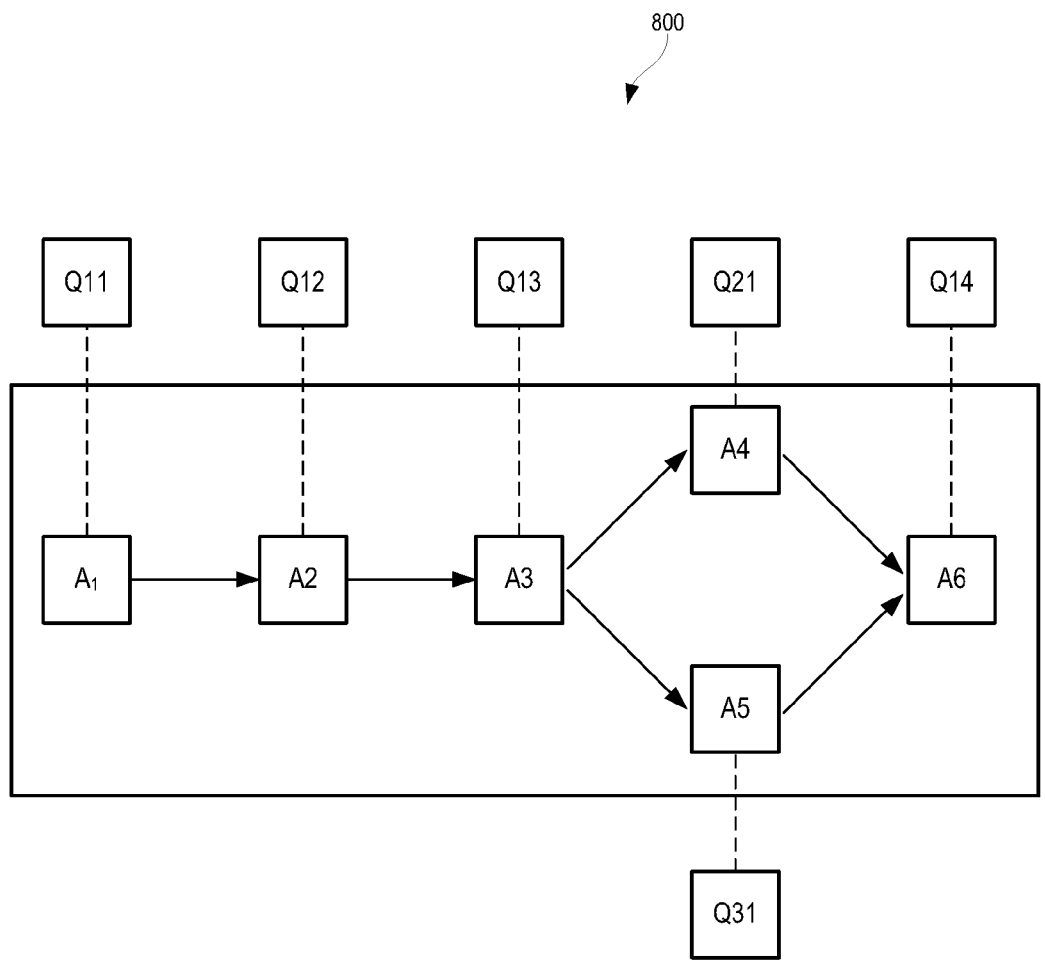
FIG. 8 illustrates an exemplary flow diagram illustrating segregation of a set of transactions belonging to a particular queue filter based on a newly introduced or additional business rule at any instance during a process, according to one embodiment.

FIG. 8 illustrates an exemplary flow diagram 800 illustrating segregation of a set of transactions belonging to a particular queue filter based on a newly introduced or additional business rule at any instance during a process, according to one embodiment. Consider that, there are two transactions T1 and T2 in a process and both are associated with a PO invoice. Further, the transaction T1 is associated with an invoice value $1000 and the transaction T2 is associated with invoice value $500. A queue filter QF1 is created based a business attribute (e.g., PO invoice) and includes transactions T1 and T2. Furthermore, to complete the transaction T1, activities A1, A2, A3, A4 and A6 need to be performed. Also, for completing the transaction T2, activities A1, A2, A3, A5 and A6 need to be performed. It can be seen that, the transactions T1 and T2 have the activities A1, A2 and A3 and A6 in common. Thus, four queues are formed by combining the queue filter QF1 with the activities A1, A2, A3 and A6 as follows: Q11=QF1+A1, Q12=QF1+A2, Q13=QF1+A3 and Q14=QF1+A6.

Further, it can be seen that, the transaction T1 is associated with the activity A4 and the transaction T2 is associated with the activity A5. In such a case, the transactions T1 and T2 cannot be a part of the queue filter QF1. Thus, additional business rules are introduced to create queue filters to segregate the transactions T1 and T2 after the activity A3 is performed. For example, the activity A4 needs to be performed for the transaction T1 having an invoice value <$1000 and the activity A5 needs to be performed for the transaction T2 having an invoice value >$1000. Therefore, the transactions T1 and T2 may be segregated based on the additional business rules (e.g., invoice value >1000 and invoice value <1000).

Accordingly, two new queue filters QF2 and QF3 are created in front of the activities A4 and A5. The queue filter QF2 includes the transaction T1 and the queue filter QF3 includes the transaction T2. Further, two new queues Q21 and Q31 are formed by combining the queue filter QF2 and the activity A4, and the queue filter QF3 and the activity A5. As mentioned above, since the transactions T1 and T2 are associated with the activity A6, the transaction T1 and T2 belongs to the queue filter QF1 and thus the queue 14 is formed by combining the queue filter QF1 and the activity A6. It can be noted that, each queue is associated with an activity and a queue filter and multiple queue filters can be created anytime during lifecycle of a transaction if the transactions needs to be further segregated as explained above.

In accordance with the above-described embodiments, if an activity is added to the business process, then a new queue filter can be added based on an additional business rule. In one example embodiment, the additional business rule is formed in response to the activity added to the business process. Then, a new queue is formed based on the new queue filter and the newly added activity. Based on the newly formed queue, a list of agents assigned for the new queue is displayed on a display of the computing device (e.g., the computing device 100 of FIG. 1).

FIG. 9 illustrates a schematic representation 900 of association of service level agreement (SLA(s)) in different levels within a process 902, according to one embodiment. Particularly, FIG. 9 illustrates association of SLA(s) at a process level, a queue filter level and a queue level. The SLA includes a service level threshold. As illustrated, a first and broadest level SLA 904 is attached to the process 902. In the example embodiment illustrated in FIG. 9, the process 902 is taken as a process instance. The SLA 904 covers all transactions within the process 902 and ensures that the process 902 is running smoothly.

For example, the SLA 904 can be for each transaction or can be in an aggregate level. An individual transaction based SLA may be "95% of transactions are to be completed within an individual SLA of 5 days". The individual transaction based SLA may be tracked by monitoring lead time associated with each transaction. An aggregate level SLA may be "90% of all transactions are to be completed within 30 days". The aggregate level SLA may be tracked by capturing information such as count of completed transactions within a stipulated time period with respect to a total number of input transactions within that time period.

From the process 902, queue filters (QF) 908A-N are generated based on business document attributes 906. Then, SLA-s 910A-N are assigned to each queue filter to associate business document attributes 906 with the SLAs 910A-N. The SLAs 910A-N are based on business document attributes 906. For example, a different SLA is defined for transactions from a strategic vendor as compared to transactions from a non-strategic vendor. In one example embodiment, the SLAs 910A-N attached to a particular queue filter are applicable for all transactions within that queue filter.

Further, queues 912AA-NN are generated by combining each queue filter with at least one activity of a set of activities 914A-N. Then, lowest level SLAs 916A-N associated with the business process are attached to each queue for internal monitoring and control as depicted in the FIG. 9. The SLAs 916A-N captures activity and business document attribute based information. In one embodiment, an alert signal is generated when a parameter for an activity associated with the queue is greater than the service level threshold.

Figure 10:
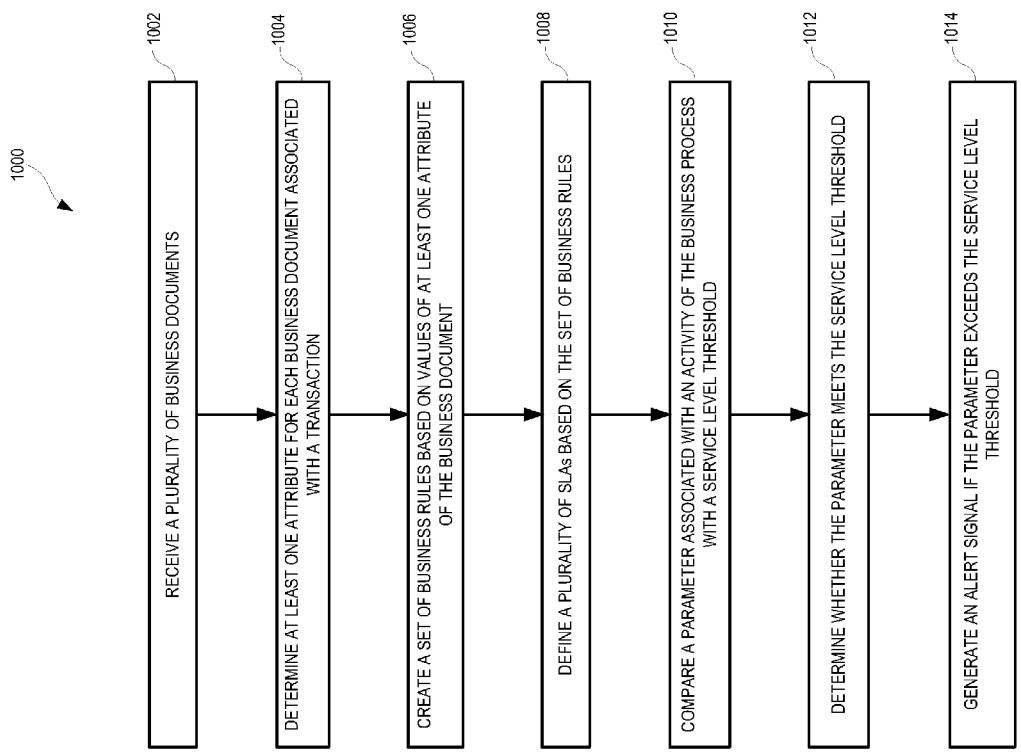
FIG. 10 illustrates a process flow chart of an exemplary method of defining SLAs based on a set of business rules, according to one embodiment.

FIG. 10 illustrates a process flow chart of an exemplary method 1000 of defining SLAs based on a set of business rules, according to one embodiment. In operation 1002, a plurality of business documents associated with a set of transactions in a business process is received. In one embodiment, each business document is processed by performing at least one activity associated with the business process. In operation 1004, for each business document associated with the transaction, at least one attribute associated with the business document is determined. In operation 1006, a set of business rules are created based on values of at least one attribute of the business documents.

In operation 1008, a plurality of SLAs is defined based on the set of business rules. In one embodiment, each SLA includes a service level threshold associated with each business rule. In operation 1010, a parameter associated with an activity of the business process (e.g., TAT, level of accuracy, etc.) is compared with the service level threshold. In operation 1012, it is determined whether the parameter meets the service level threshold. In operation 1014, an alert signal is generated if the parameter exceeds the service level threshold.

Figure 11A:
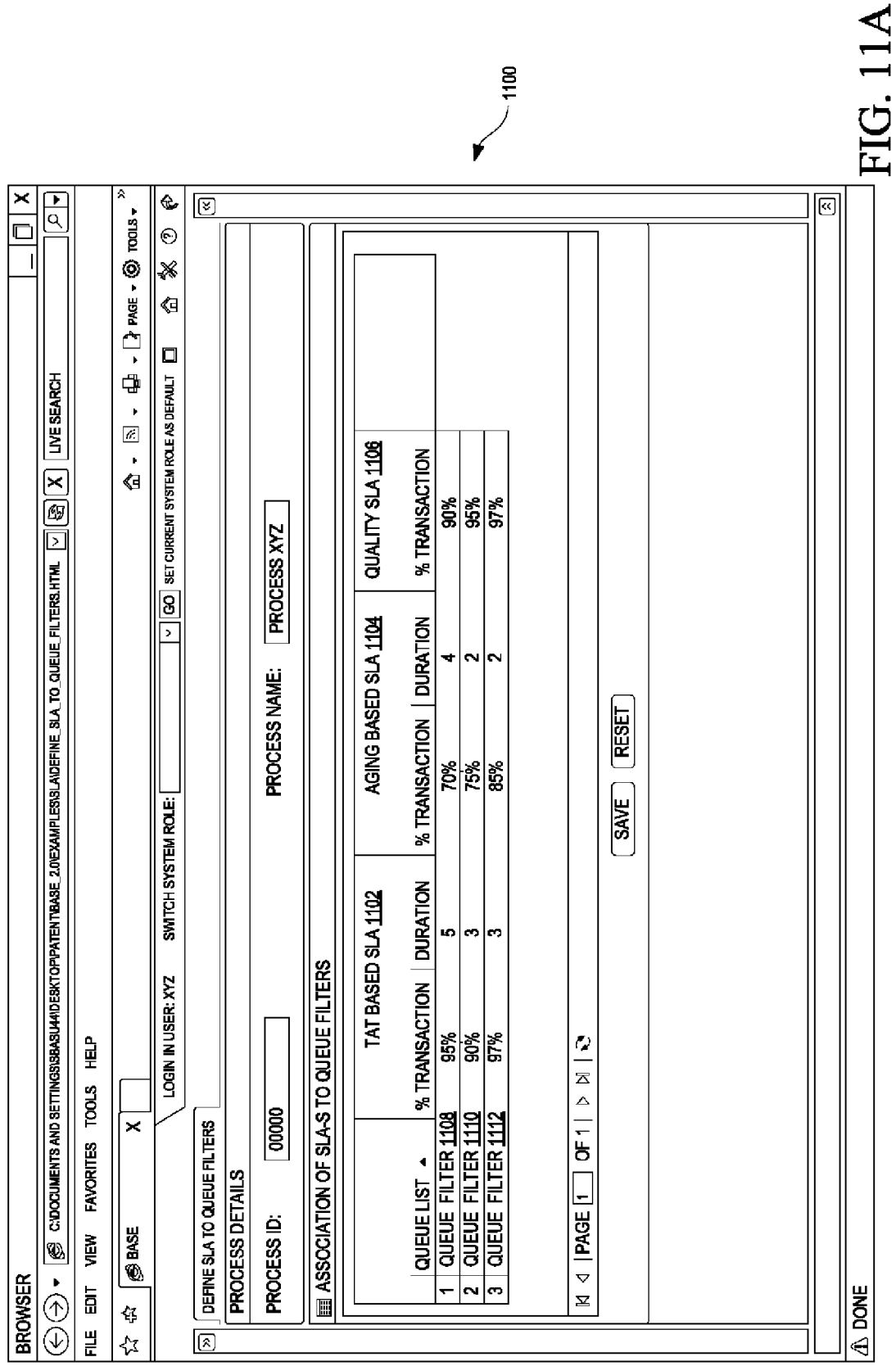
FIG. 11A is a screenshot view showing association of SLAs to queue filters associated with the business process, according to one embodiment.

FIG. 11A is a screenshot view 1100 showing association of SLAs to queue filters associated with the business process, according to one embodiment. In FIG. 11A, a turn-around time (TAT) based SLA 1102, an aging based SLA 1104 and a quality based SLA 1106 are associated to the queue filters. The TAT based SLA 1102 is associated to each of the queue filters by defining percentage of transactions to be completed in a specific duration. Also, the ageing based SLA 1104 is associated to each of the queue filters by defining percentage of transactions to be completed before expiry of a specific duration. The quality SLA 1106 may be associated to each of the queue filters by defining percentage of transactions that should meet the quality standard.

In the example embodiment illustrated in FIG. 11A, the screenshot view 1100 shows the queue filters 1108, 1110, 1112 to which the TAT based SLA 1102, the ageing based SLA 1104 and the quality based SLA 1106 are associated. As illustrated, for the queue filter 1108, the TAT based SLA 1102 may be '95% of transactions associated to the queue filter 1108 are to be completed within in SLA of 5 days'. Further, the ageing based SLA 1104 associated to the queue filter 1108 may be 'not more than 70% of the transactions should be of age more than 4 days'. Furthermore, the quality based SLA 1106 associated to the queue filter 1108 may be 'not more than 90% of the completed transactions can have errors'.

Similarly, for the queue filter 1110, the TAT based SLA 1102 may be '90% of transactions associated to the queue filter 1110 are to be completed within in SLA of 3 days'. Further, the ageing based SLA 1104 associated to the queue filter 1110 may be 'not more than 75% of the transactions should be of age more than 2 days'. Furthermore, the quality based SLA 1106 associated to the queue filter 1110 may be 'not more than 95% of the completed transactions can have errors'.

Also, for the queue filter 1112, the TAT based SLA 1102 may be '97% of transactions associated to the queue filter 1112 are to be completed within in SLA of 4 days'. Further, the ageing based SLA 1104 associated to the queue filter 1112 may be 'not more than 80% of the transactions should be of age more than 2 days'. Furthermore, the quality based SLA 1106 associated to the queue filter 1112 may be 'not more than 97% of the completed transactions can have errors'.

Figure 11B:
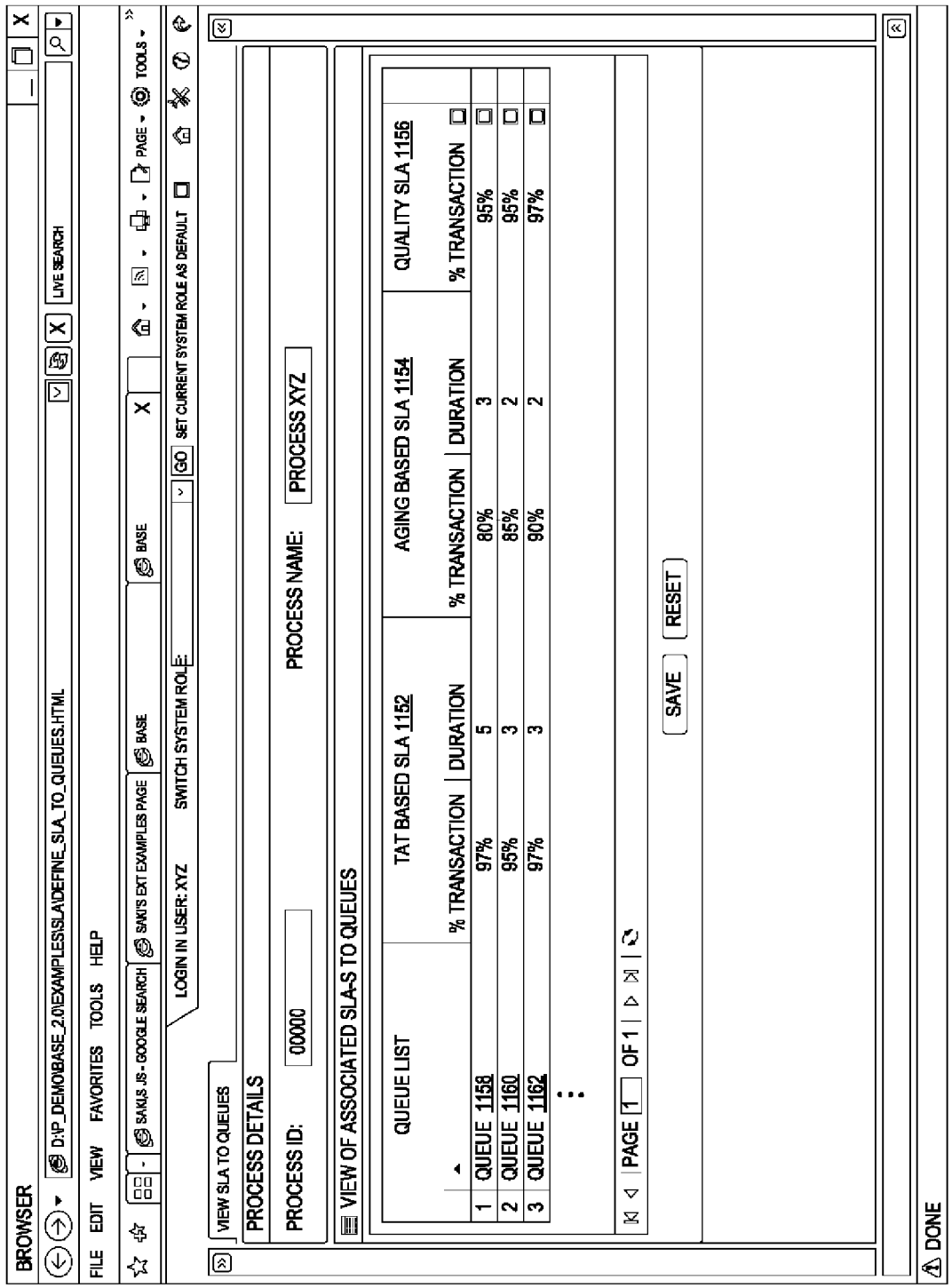
FIG. 11B is a screenshot view showing association of SLAs to queue associated with the business process, according to one embodiment.

FIG. 11B is a screenshot view 1150 showing association of SLAs to queues associated with the business process, according to one embodiment. In FIG. 11B, a turn-around time (TAT) based SLA 1152, an aging based SLA 1154 and a quality based SLA 1156 are associated to queues. The TAT based SLA 1152 is associated to each of the queues by defining percentage of transactions to be completed in a specific duration. Also, the ageing based SLA 1154 is associated to each of the queues by defining percentage of transactions to be completed before expiry of a specific duration. The quality SLA 1156 may be associated to each of the queues by defining percentage of transactions that should meet the quality standard.

In the example embodiment illustrated in FIG. 11B, the screenshot view 1150 shows the queues 1158, 1160, 1162 to which the TAT based SLA 1152, the ageing based SLA 1154 and the quality based SLA 1156 are associated. The queue 1158 is formed by combining the queue filter 1108 with an activity 1, the queue 1160 is formed by combining the queue filter 1110 with an activity 2 and so on. As illustrated, for the queue 1158, the TAT based SLA 1152 may be '97% of transactions associated to the queue 1158 are to be completed within in 5 days'. Further, the ageing based SLA 1154 associated to the queue 1158 may be 'not more than 80% of the transactions should be of age more than 3 days'. Furthermore, the quality based SLA 1156 associated to the queue 1158 may be 'not more than 95% of the completed transactions can have errors'.

Similarly, for the queue 1160, the TAT based SLA 1152 may be '95% of transactions associated to the queue 1160 are to be completed within 3 days'. Further, the ageing based SLA 1154 for the queue 1160 may be 'not more than 85% of the transactions should be of age more than 2 days'. Furthermore, the quality based SLA 1156 associated to the queue 1160 may be 'not more than 95% of the completed transactions can have errors'.

Also, for the queue 1162, the TAT based SLA 1152 may be '97% of transactions associated to the queue 1162 are to be completed within 4 days'. Further, the ageing based SLA 1154 for the queue 1162 may be 'not more than 90% of the transactions should be of age more than 2 days'. Furthermore, the quality based SLA 1156 associated to the queue 1162 may be 'not more than 97% of the completed transactions can have errors'.

FIG. 12 illustrates a table 1200 showing different data fields used for defining queues, according to one embodiment. In one embodiment, the queues are formed based on the exclusive queue module 306 which is configured to form the queues without an overlapping between the queues. The exclusive queue module 306 populates data fields for the queues in the table 1200 and determines a presence of the overlapping between the queues by analyzing the data fields in the table. The data fields are based on the attributes of the business documents.

In one embodiment, the overlapping between the queues is based on:

$$F = [\Pi_{i=1}^{q}(1-|(B_i^p - B_i^c)|)] \times [\Pi_{i=1}^{r}(\Sigma_{j=1}^{r'}(D_{ij}^p \times D_{ij}^c))] \times [\Pi_{i=1}^{s}(\Sigma_{j=1}^{s'}(C_{ij}^p \times C_{ij}^c))],$$

where, F indicates a final score, q indicates a maximum number of the data fields of binary nature, p and c indicates two respective queues being compared, r indicates a maximum number of the data fields of discrete nature, r' indicates a maximum number of classes formed within the data fields of discrete nature, s indicates a maximum number of the data fields of continuous nature, and s' indicates a maximum number of blocks formed within each data field of continuous nature.

As illustrated, the table 1200 includes a queue number data field 1202, a binary data field column 1204, a continuous data field column 1206 and a discrete data field column 1208. The queue number data field 1202 indicates a unique identifier associated with queues defined for a particular transaction. The binary data field column 1204 displays information which is binary in nature. For example, the binary data field column 1204 displays a value '0' if a business document type is a PO and a value '1' if the business document type is a non-PO.

The continuous data field column 1206 includes information used to define the queues. The information provided by the user is converted from continuous to discrete by creating suitable classes. The discrete data field column 1208 displays information associated with data elements provided by user that is discrete in nature. For example, the discrete data field column 1206 may display information associated with business document attributes such as origin country, languages, and associated activities like indexing, validation, and so on.

In the example embodiment illustrated in FIG. 12, the table 1200 illustrates five queues defined in a process. For the queue 1, the binary data field column 1204 indicates that a business document type is a PO and a vendor type is strategic. The continuous data field column 1206 indicates that an invoice value is '$100'. The discrete data field column 1208 indicates an origin country as the United States (US). So, the queue 1 is formed for the business document type PO, document coming from strategic vendor, value of invoice less than $100 and the US as the origin country.

Similarly, queue 2, queue 3, queue 4 and queue 5 are formed by specifying the business document type, the vendor type, the invoice value and the origin country. When a queue is formed, values in the binary data field column 1204, the continuous data field column 1206 and the discrete data field column 1208 are compared with the values associated with the existing queues, such that the queues thus formed are exclusive in nature, as will be illustrated in FIG. 13A-C.

FIG. 13A illustrates a table 1300A showing a queue formed using various data fields, according to one embodiment. The table 1300A includes a queue number data field 1302, a binary data field column 1304, a continuous data field column 1306 and a discrete data field column 1308. As illustrated, the queue number data field 1302 displays a queue formed as 'queue 1'. The binary data field column 1304 displays value for PO as '1' and value for strategic as '1' which means that the business document type is purchase order and the vendor type is 'strategic'. The continuous data field column 1306 displays value '1' under '$100' category which indicates that the value of invoice is '$100'. Further, the discrete data field column 1308 displays value '1' under 'US' category which indicates that the origin country associated with the business document is 'US'.

FIG. 13B illustrates a table 1300B showing computation of a score upon formation of two queues, according to one embodiment. The table 1300B displays queues 'queue 1' and 'queue 2' and a score for each data field. Based on the score in the each data field, a final score (F) is computed to determine overlapping between the queue 1 and the queue 2. In other words, the final score (F) is obtained based on whether a newly created queue (e.g., queue 2) is a subset or superset of the existing queue (e.g., queue 1). For example, two respective queues being compared are a subset or superset to each other if the final score (F) is a non-zero number.

In one example embodiment, the final score (F) is computed using the following expression:

$$F = [\Pi_{i=1}^{q}(1-|(B_i^p - B_i^c)|)] \times [\Pi_{i=1}^{r}(\Sigma_{j=1}^{r'}(D_{ij}^p \times D_{ij}^c))] \times [\Pi_{i=1}^{s}(\Sigma_{j=1}^{s'}(C_{ij}^p \times C_{ij}^c))],$$

with q indicating a maximum number of the data field of binary nature, p and c indicating two respective queues being compared, r indicating a maximum number of the data field of discrete nature, r' indicating a maximum number of classes formed within the data field of discrete nature, s indicating a maximum number of the data field of continuous nature, and s' indicating a maximum number of blocks formed within each data field of continuous nature.

In the example embodiment illustrated in FIG. 13B, the score for binary data field in the binary field column 1304 is calculated as: (1×0)=0 for PO and (1×1)=1 for strategic. Further, the score for continuous data field in the continuous data field column 1306 is calculated as (1×0)+(0×1)+(0×0)=0 and the score for discrete data field in the discrete data field column 1308 is calculated as (1×0)+(0×1)+(0×0)=0. The final score (F) is computed using [(score for PO)×(score for strategic)]×[(score for continuous data field)]×[(value for discrete data field)]=0×1×0×0=0. The final score (F) is 0 means there is a mismatch between the queue 2 and the queue 1. Hence, the two queues are not subset or superset of each other.

FIG. 13C illustrates a table 1300C showing overlapping queues, according to one embodiment. The table 1300C displays five queues, viz. queue 1, queue 2, queue 3, queue 4 and queue 5. In the example embodiment illustrated in FIG. 13C, when the queue 3 is formed, scores are computed by comparing the queue 3 with the queue 1 and the queue 2 to determine overlapping of queues. Further, the queue 4 cannot be formed as the final score is non-zero which implies that the queue 4 is matching with the queue 3. In other words, the queue 4 and the queue 3 is subset of each other. Also, the queue 5 cannot be formed as the queue 5 is matching with the queue 1. Then, an alert is sent to the user based on the comparison of queues.

Further, the queue 4 and the queue 5 are deleted from the table 1300C, where the queues are stored in a memory associated with a computing device (e.g., the computing device 100 of FIG. 1) as discarded queues. Then, additional data field is added to the table 1300C and the discarded queues are restored from the memory to the table 1300C. An overlapping between a current set of queues in the table 1300C is also determined.

Figure 14A:
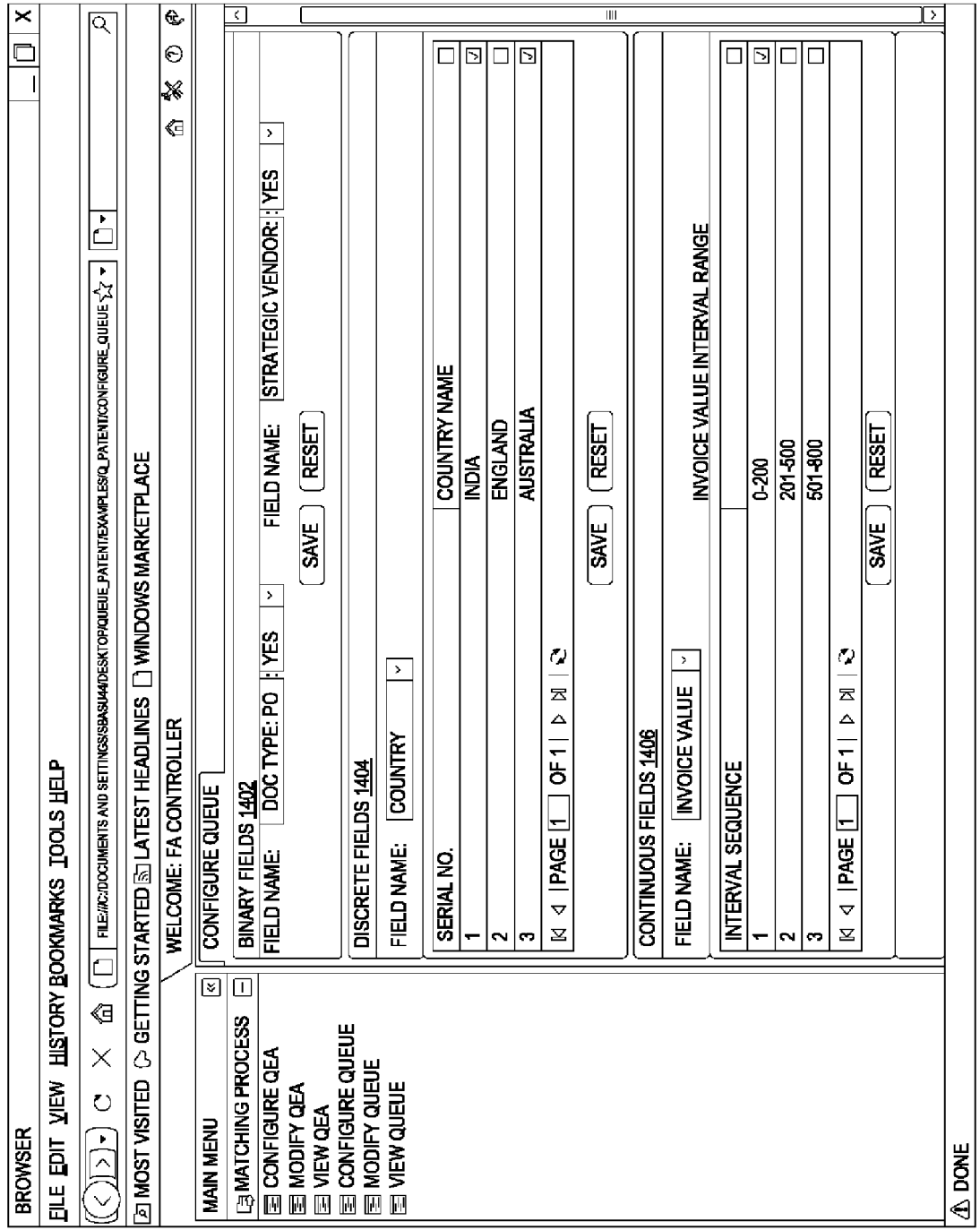
FIG. 14A is a screenshot view showing defining of queues using various data fields, according to one embodiment.

FIG. 14A is a screenshot view 1400 showing defining of queues using various data fields, according to one embodiment. The screenshot view 1400 enables the administrator to define queues by configuring a binary field 1402, a discrete field 1404 and a continuous field 1406. In the example embodiment illustrated in FIG. 14A, the binary field 1402 is configured by defining a document type as 'PO' and vendor type as 'strategic vendor'. The discrete field 1404 is configured by defining countries associated with the transactions as 'India', 'England' and 'Australia'. Further, the continuous field 1406 is configured by defining an invoice value interval range associated with the transactions as '0-200', '201-500' and '501-800'.

Figure 14B:
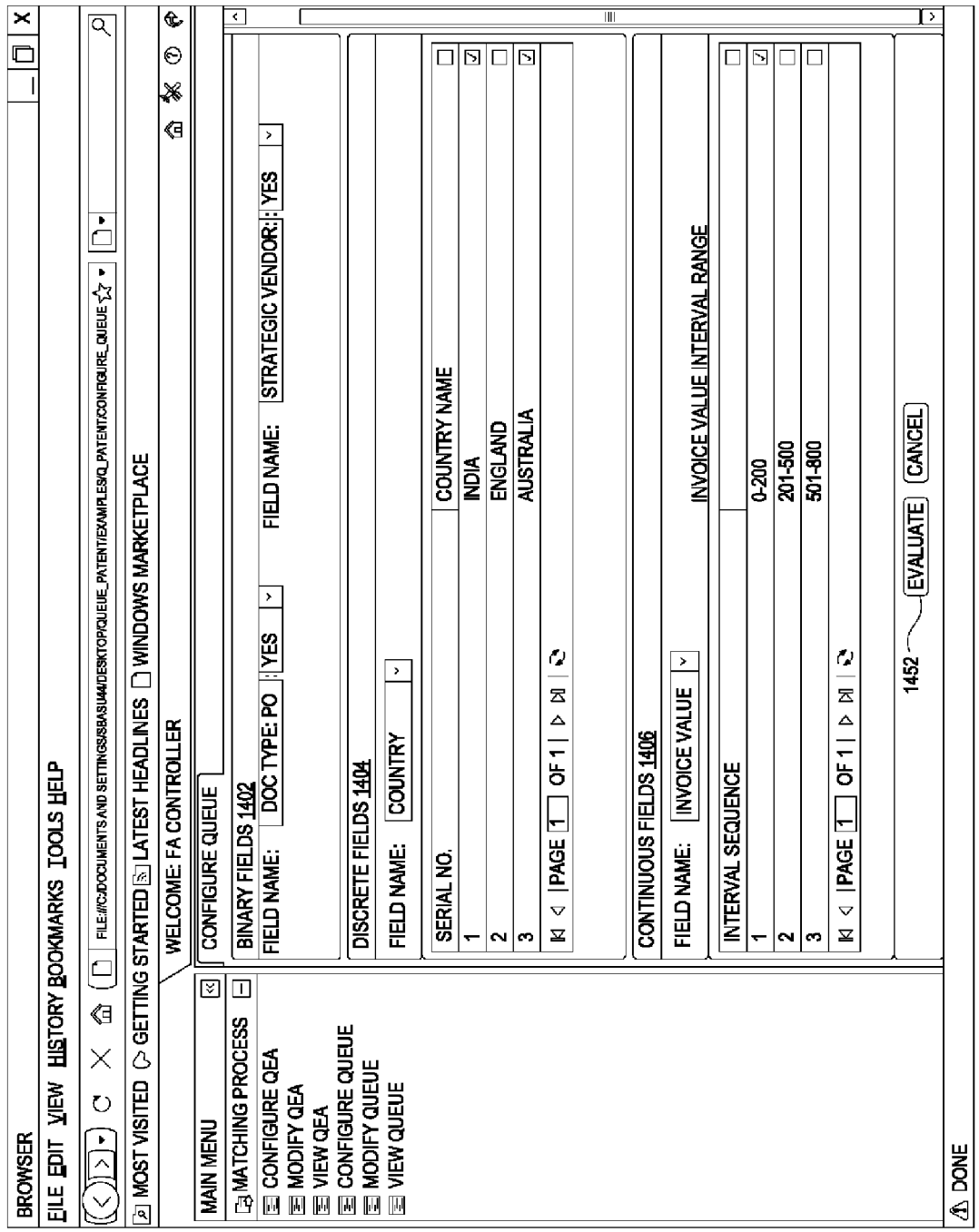
FIG. 14B is a screenshot view showing evaluating of a newly created queue based on the data fields, according to one embodiment.

FIG. 14B is a screenshot view 1450 showing evaluating of a newly created queue based on the data fields, according to one embodiment. As illustrated, the screenshot view 1450 enables the administrator to determine a presence of the overlapping between the newly created queue and the existing queues by analyzing the data fields using a evaluate button 1452. A queue is said to be overlapping another queue when the queue is a superset or subset of said another queue. The presence of the overlapping between queues is described in greater detail with respect to FIGS. 12 through 13C. Further, if the newly created queue overlaps with one of the existing queues then an alert message is generated on the display 128 of the computing device 100. If the overlapping is found, the administrator may be allowed to redefine the queue so that the queue is not a subset or superset of the existing queues.

Figure 15:
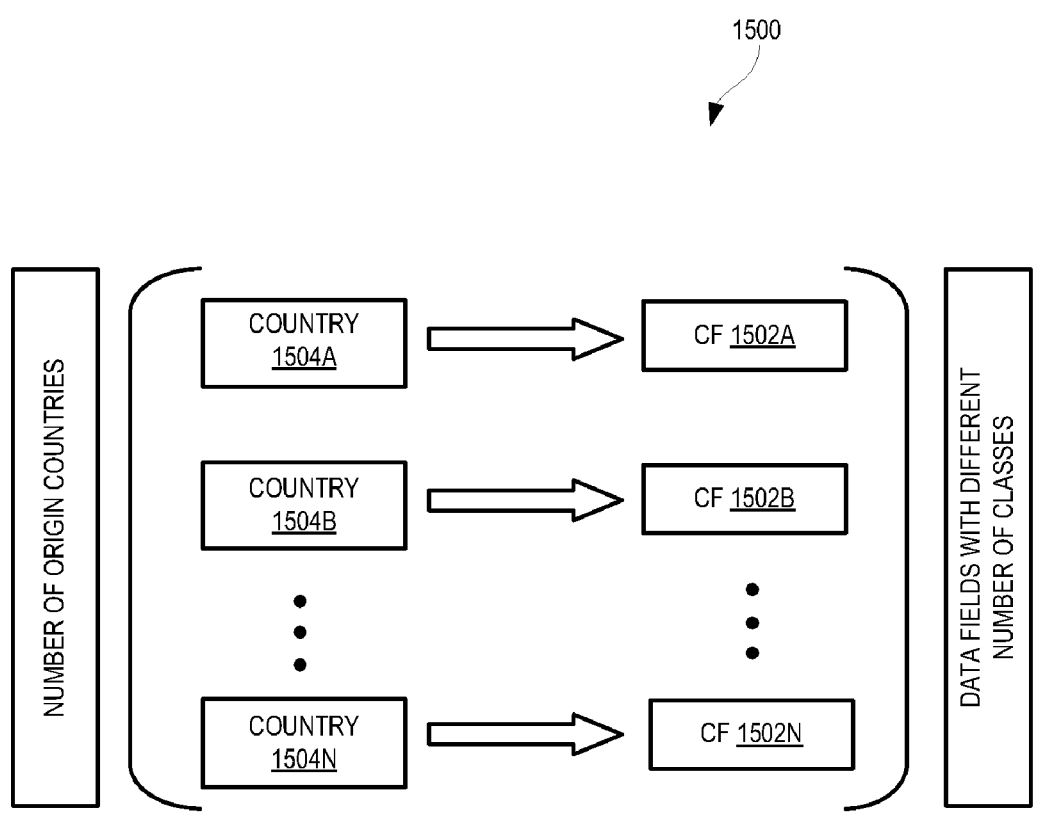
FIG. 15 illustrates a relationship diagram showing one to one dependency of one data field on another data field, according to one embodiment.

FIG. 15 illustrates a relationship diagram 1500 showing one to one dependency of one data field on another data field, according to one embodiment. As illustrated, classes created for continuous data fields (CF) 1502A-N may depend on data in discrete data fields 1504A-N. In the example embodiment illustrated in FIG. 15, the continuous data fields (CF) with different number of classes 1502A-N are shown dependent on the origin countries 1504A-N.

For example, in case of invoice processing, if the country 1504A is the US, then different number of classes can be 0-100, 101-200, 201-300, 301-500 and >500. Similarly, if the country 1504B is United Kingdom (UK), then the different number of classes can be 0-300, 301-500 and >500. Thus, the different number of classes for the same type of continuous data fields is dependent on an origin country of invoice.

Figure 16:
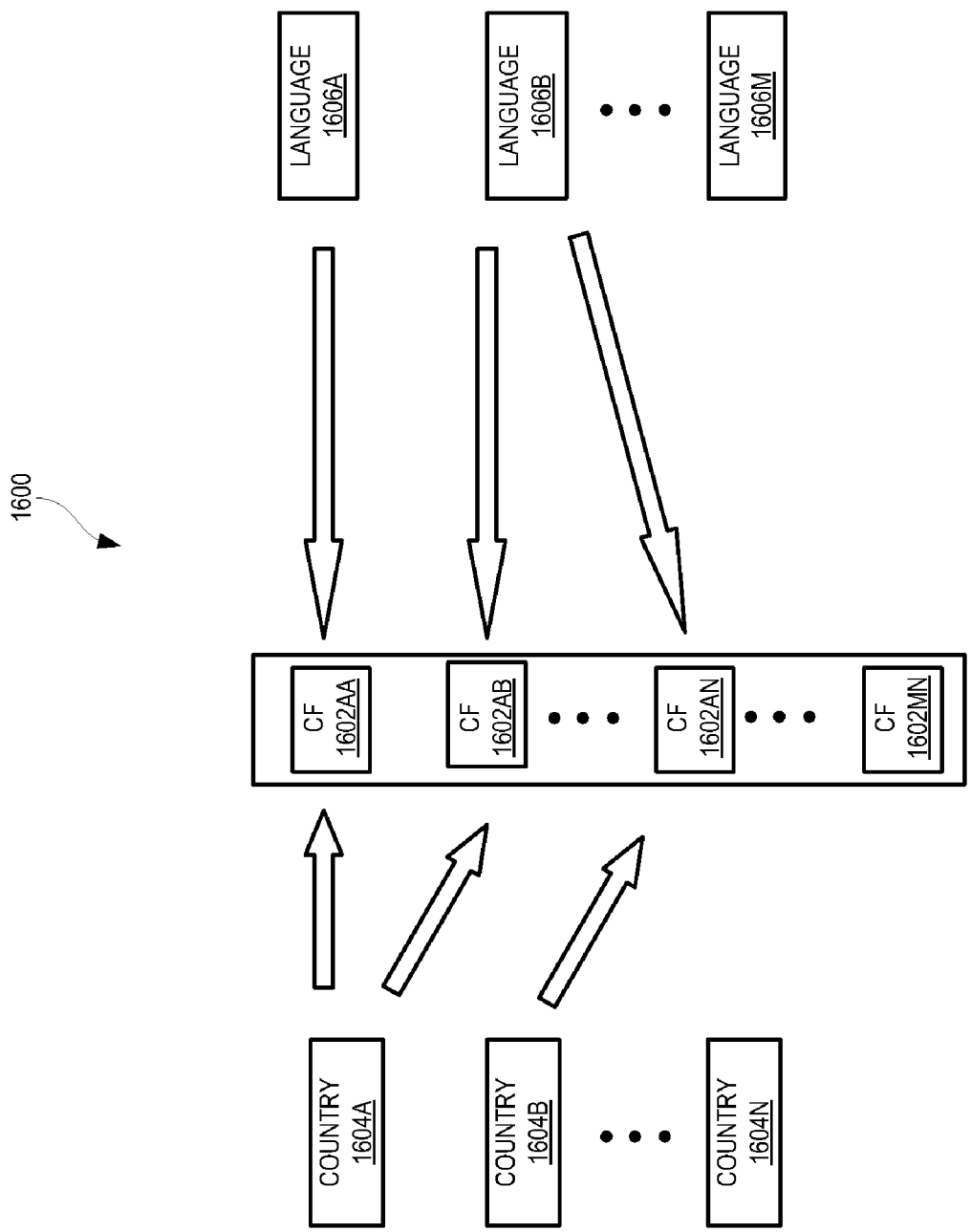
FIG. 16 illustrates a relationship diagram showing dependency of one data field on more than one other data field, according to one embodiment.

FIG. 16 illustrates a relationship diagram 1600 showing dependency of one data field on more than one other data field, according to one embodiment. As illustrated, classes of a continuous data field are dependent on data in two discrete data fields, viz. origin country and languages used. For example, the classes created based on an invoice value may depend on the origin country and the language used.

In the example embodiment illustrated in FIG. 16, number of continuous data fields with different number of classes is a multiple of a number of countries 1604A-N and number of languages 1606A-M. For example, CF 1602A is a continuous data field for the country 1604A and the language 1606A. It can be noted that, CF 1602AA-MN are generated based on different permutations of the countries 1604A-N and the languages 1606A-M. Although, FIG. 15 and FIG. 16 illustrate dependency relationship between a continuous data field(s) and a discrete data field(s), one skilled in the art can understand that one discrete data field may also be dependent on another discrete data field in the manner described above.

Figure 17:
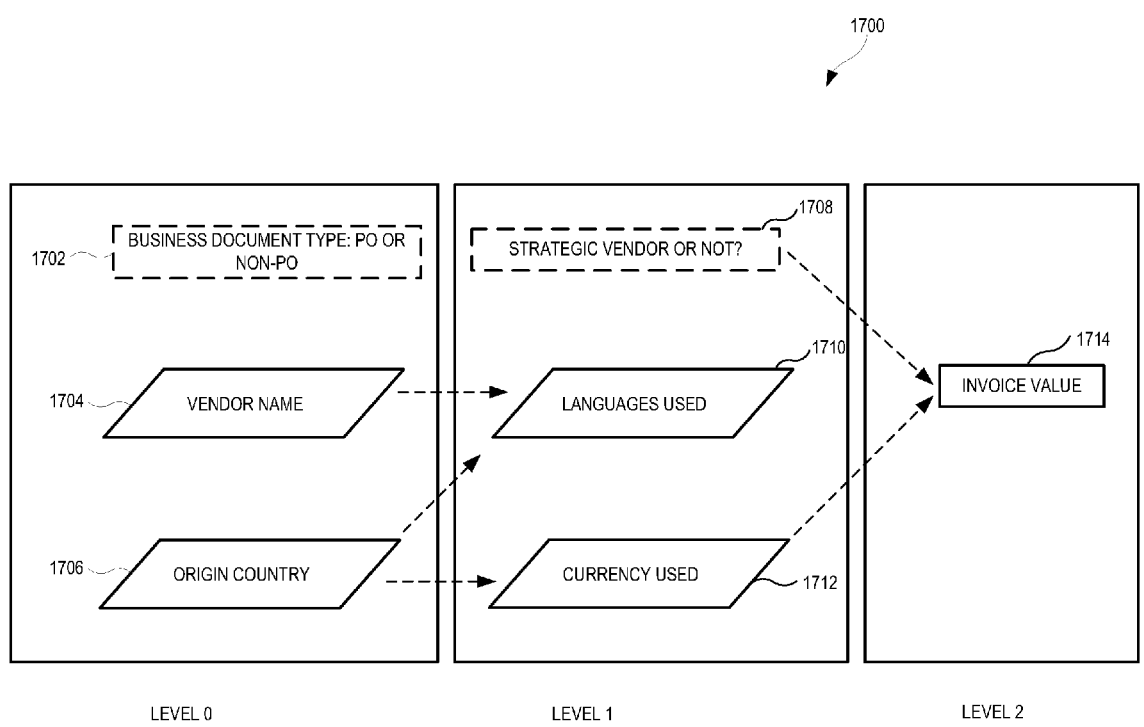
FIG. 17 illustrates a relationship diagram showing precedence relationship between different data fields, according to one embodiment.

FIG. 17 illustrates a relationship diagram 1700 showing precedence relationship between different data fields, according to one embodiment. In one embodiment, exclusivity of queues formed is identified based on the precedence relationship diagram 1700. When data fields are dependent on each other (e.g., as shown in FIG. 15 and FIG. 16), the exclusivity of the queues is identified in a manner described below. Prior to initiating a queue formation process, all data fields required for defining the queues are identified. Further, the precedence relationship diagram 1700 for the identified data fields is created.

As illustrated, the precedence relationship diagram 1700 is created in such a way that the data field(s) without any dependency on other data field(s) is on level 0 and the data field(s) with dependency on the data field(s) on the level 0 is on level 1. Similarly, other levels including the data fields are formed in the precedence relationship diagram 1700. In the example embodiment illustrated in FIG. 17, the precedence relationship diagram 1700 includes three levels, viz. a level 0, a level 1 and a level 2.

As illustrated, the level 0 includes a binary data field 1702 indicating a type of business document (e.g., PO or non-PO). The level 0 also includes a continuous data field 1704 indicating vendor name associated with the business document and a discrete data field 1706 indicating an origin country of the business document. The binary data field 1702, the continuous data field 1704 and the discrete data field 1706 are included in the level 0 of the precedence relationship diagram 1700 as the data fields 1702-1706 are data fields without any dependency on other data fields.

Similarly, the level 1 includes a binary data field 1708 indicating type of vendor (e.g., strategic or non-strategic). The level 1 also includes a continuous data field 1710 indicating languages used in the business document and a discrete data field 1712 indicating a currency used in the business document. The binary data field 1708, the continuous data field 1710 and the discrete data field 1712 are included in the level 1 of the precedence relationship diagram 1700 as the data fields 1710 and 1712 are data fields with dependency on the data fields 1704 and 1706 in the level 0. Also, the level 2 includes a continuous data field 1714 indicating an invoice value associated with the business document and is dependent on the data fields 1708 and 1710 of the level 1.

Upon creation of the precedence relationship diagram 1700, a new queue is formed using the data fields (e.g., the data fields 1702-1714). Then, the data fields associated with the newly formed queue are compared in the same order as in the precedence relationship diagram 1700 to identify exclusivity of the queue. In other words, the data fields in the level 0 are checked first and then corresponding data fields in the level 1 are used to compare. For example, in the newly formed queue, currency used is compared to currency data fields of the previously created queues which have same origin country.

In various embodiments described in FIGS. 1 through 17, a queue facilitates flow of activities in a business process. Also, the queue enables tracking of each transaction associated with the process. In addition, the queue facilitates efficient processing of the activities and efficient allocation of activities to agents (i.e., right activity to right agent). The above-described method and system provides flexibility in terms of associating multiple queue filters in different stages of the same transaction. In this manner, any variations in the process can be handled by adding or deleting queue filters without the need for restarting all over again, thereby making the process more efficient. The above-described method and system also enables tracking and managing of the SLAs to successfully operate the outsourced business process.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present disclosure is not intended to be limited to the embodiments shown herein but is to be accorded the widest scope consistent with the principles and features disclosed herein.

What is claimed is:

1. A method, implemented in a computing device, for workflow management of a business process, comprising:
   (a) determining respective attributes of a plurality of business documents received via an input device of the computing device;
   (b) receiving a set of business rules associated with the plurality of business documents, wherein the set of business rules are based on the attributes of the plurality of business documents;
   (c) forming a plurality of queue filters for segregating a set of transactions associated with the plurality of business documents based on the set of business rules;
   (d) forming a plurality of queues based on the plurality of queue filters and at least one activity associated with the set of transactions, wherein forming the plurality of queues comprises:
   attaching a service level agreement associated with the business process to a queue of the plurality of queues, wherein the service level agreement comprises a service level threshold; and
   generating an alert signal when a parameter for an activity associated with the queue is greater than the service level threshold;
   (e) determining a presence of overlapping between the plurality of queues, wherein determining the overlapping between the plurality of queues is based on:

$$F = [\Pi^q_{i=1}(1-|(B^p_i - B^c_i)|)] \times [\Pi^r_{i=1}(\Sigma^{r'}_{j=1}(D^p_{ij} \times D^c_{ij}))] \times [\Pi^s_{i=1}(\Sigma^{s'}_{j=1}(C^p_{ij} \times C^c_{ij}))],$$

with F indicating a final score, q indicating a maximum number of the data fields of binary nature, p and c indicating two respective queues being compared and refer to a previously formed queue and a currently formed queue respectively, r indicating a maximum number of the data fields of discrete nature, r' indicating a maximum number of classes formed within the data fields of discrete nature, s indicating a maximum number of the data fields of continuous nature, s' indicating a maximum number of blocks formed within each data field of continuous nature, $B_i$ refers to the data fields of binary nature, $D_{ij}$ refers to the data fields of discrete nature, $C_{ij}$ refers to the data fields of continuous nature, and wherein the classes and blocks define categories in the data fields of discrete nature and continuous nature respectively; and
   (f) generating on a display of the computing device, a list of agents assigned for each of the plurality of queues.

2. The method of claim 1, wherein the input device of the computing device comprises a data entry device operable to process the attributes of the plurality of business documents when the attributes of the plurality of business documents are manually entered; and a scanning device operable to read the plurality of business documents in a specified format.

3. The method of claim 1, wherein the forming of the plurality of queues is based on an exclusive queue module which is configured to form the plurality of queues without an overlapping between the plurality of queues.

4. The method of claim 3, wherein the exclusive queue module is configured to perform:
populating the data fields for the plurality of queues in a specified format, wherein the data fields are based on the attributes of the plurality of business documents; and
determining the presence of the overlapping between the plurality of queues by analyzing the data fields in the specified format.

5. The method of claim 4, further comprising generating an alert message on the display of the computing device when one of the pluralities of queues is a superset or subset of another one of the plurality of queues.

6. The method of claim 1, wherein the two respective queues being compared are a subset or superset to each other if the final score (F) is a non-zero number.

7. The method of claim 6, further comprising deleting one of the two respective queues from the specified format, wherein the one of the two respective queues is stored in a memory associated with the computing device as one of discarded queues.

8. The method of claim 7, further comprising:
adding an additional data field to the specified format;
restoring the discarded queues from the memory to the specified format; and
determining an overlapping between the plurality of queues in the specified format.

9. The method of claim 1, further comprising:
adding a new queue filter based on an additional business rule if an activity added to the business process, wherein the additional business rule is formed in response to the activity added to the business process; and
performing (d), (e), and (f) again based on the plurality of queue filters, the new queue filter, the at least one activity, and the activity added to the business process.

10. The method of claim 1, wherein the business process comprises an account payable.

11. The method of claim 10, wherein each queue filter is defined based on an input document type and a value of invoice.

12. The method of claim 11, wherein the input document type comprises a data field of binary nature; and the value of invoice comprises a data field of continuous nature.

13. The method of claim 12, wherein the input document type comprises a purchase order and a non-purchase order.

14. The method of claim 13, wherein the at least one activity comprises a data extraction activity, a purchase order validation activity, and a vendor validation activity.

15. The method of claim 14, wherein each queue comprises a name of the business process, a name of the input document, one of the set of business rules, and a name of the at least one activity.

16. A non-transitory computer-readable storage medium having instructions that, when executed by a computing device, cause the computing device to perform a method for workflow management of a business process, comprising:
determining respective attributes of a plurality of business documents received via an input device of the computer;
receiving a set of business rules associated with the plurality of business documents, wherein the set of business rules are based on the attributes of the business documents;
forming a plurality of queue filters for segregating a set of transactions associated with the plurality of business documents based on the set of business rules;
forming a plurality of queues based on the plurality of queue filters and at least one activity associated with the set of transactions, wherein forming the plurality of queues comprises:
attaching a service level agreement associated with the business process to a queue of the plurality of queues, wherein the service level agreement comprises a service level threshold; and
generating an alert signal when a parameter for an activity associated with the queue is greater than the service level threshold;
determining a presence of overlapping between the plurality of queues, wherein determining the overlapping between the plurality of queues is based on:

$$F = [\Pi^q_{i=1}(1-|(B^p_i - B^c_i)|)] \times [\Pi^r_{i=1}(\Sigma^{r'}_{j=1}(D^p_{ij} \times D^c_{ij}))] \times [\Pi^s_{i=1}(\Sigma^{s'}_{j=1}(C^p_{ij} \times C^c_{ij}))],$$

with F indicating a final score, q indicating a maximum number of the data fields of binary nature, p and c indicating two respective queues being compared and refer to a previously formed queue and a currently formed queue respectively, r indicating a maximum number of the data fields of discrete nature, r' indicating a maximum number of classes formed within the data fields of discrete nature, s indicating a maximum number of the data fields of continuous nature, s' indicating a maximum number of blocks formed within each data field of continuous nature, $B_i$ refers to the data fields of binary nature, $D_{ij}$ refers to the data fields of discrete nature, $C_{ij}$ refers to the data fields of continuous nature, and wherein the classes and blocks define categories in the data fields of discrete nature and continuous nature respectively; and
generating on a display of the computer a list of agents assigned for each of the plurality of queues.

17. An apparatus for workflow management of a business process, comprising:
a processor; and
a memory for temporarily storing a set of instructions, when executed by the processor, causes the processor to perform a method comprising:
determining respective attributes of a plurality of business documents received via an input device of a computing device;
receiving a set of business rules associated with the plurality of business documents, wherein the set of business rules are based on the attributes of the business documents;
forming a plurality of queue filters for segregating a set of transactions associated with the plurality of business documents based on the set of business rules;
forming a plurality of queues based on the plurality of queue filters and at least one activity associated with the set of transactions, wherein forming the plurality of queues comprises:
attaching a service level agreement associated with the business process to a queue of the plurality of queues, wherein the service level agreement comprises a service level threshold; and
generating an alert signal when a parameter for an activity associated with the queue is greater than the service level threshold;

determining a presence of overlapping between the plurality of queues, wherein determining the overlapping between the plurality of queues is based on:

$$F=[\Pi^q_{i=1}(1-|(B^p_i-B^c_i)|)]\times[\Pi^r_{i=1}(\Sigma^{r'}_{j=1}(D^p_{ij}\times D^c_{ij}))]\times[\Pi^s_{i=1}(\Sigma^{s'}_{j=1}(C^p_{ij}\times C^c_{ij}))],$$

with F indicating a final score, q indicating a maximum number of the data fields of binary nature, p and c indicating two respective queues being compared and refer to a previously formed queue and a currently formed queue respectively, r indicating a maximum number of the data fields of discrete nature, r' indicating a maximum number of classes formed within the data fields of discrete nature, s indicating a maximum number of the data fields of continuous nature, s' indicating a maximum number of blocks formed within each data field of continuous nature, $B_i$ refers to the data fields of binary nature, $D_{ij}$ refers to the data fields of discrete nature, $C_{ij}$ refers to the data fields of continuous nature, and wherein the classes and blocks define categories in the data fields of discrete nature and continuous nature respectively; and generating on a display of the computing device a list of agents assigned for each of the plurality of queues.

18. The apparatus of claim 17, further comprising an application storage storing the set of instructions.

19. A computer network system comprising a server and a plurality of clients, when the server requested by the clients for a service, causes the clients to perform a method for workflow management of a business process comprising:

determining respective attributes of a plurality of business documents received via an input device of a computing device;

receiving a set of business rules associated with the plurality of business documents, wherein the set of business rules are based on the attributes of the business documents;

forming a plurality of queue filters for segregating a set of transactions associated with the plurality of business documents based on the set of business rules;

forming a plurality of queues based on the plurality of queue filters and at least one activity associated with the set of transactions, wherein forming the plurality of queues comprises:

attaching a service level agreement associated with the business process to a queue of the plurality of queues, wherein the service level agreement comprises a service level threshold; and generating an alert signal when a parameter for an activity associated with the queue is greater than the service level threshold;

determining a presence of overlapping between the plurality of queues, wherein determining the overlapping between the plurality of queues is based on:

$$F=[\Pi^q_{i=1}(1-|(B^p_i-B^c_i)|)]\times[\Pi^r_{i=1}(\Sigma^{r'}_{j=1}(D^p_{ij}\times D^c_{ij}))]\times[\Pi^s_{i=1}(\Sigma^{s'}_{j=1}(C^p_{ij}\times C^c_{ij}))],$$

with F indicating a final score, q indicating a maximum number of the data fields of binary nature, p and c indicating two respective queues being compared and refer to a previously formed queue and a currently formed queue respectively, r indicating a maximum number of the data fields of discrete nature, r' indicating a maximum number of classes formed within the data fields of discrete nature, s indicating a maximum number of the data fields of continuous nature, s' indicating a maximum number of blocks formed within each data field of continuous nature, $B_i$ refers to the data fields of binary nature, $D_{ij}$ refers to the data fields of discrete nature, $C_{ij}$ refers to the data fields of continuous nature, and wherein the classes and blocks define categories in the data fields of discrete nature and continuous nature respectively; and generating on a display of the computing device a list of agents assigned for each of the plurality of queues.

20. A system for workflow management of a business process, comprising:

a processor;

memory coupled to the processor, wherein the memory includes a workflow module for managing workflow of a business process, and wherein the workflow module comprises:

a queue filter module;

an exclusive queue module; and a work allocation module, wherein the workflow module determines respective attributes of a plurality of business documents, and wherein the queue filter module receives a set of business rules associated with the plurality of business documents, and wherein the set of business rules are based on the attributes of the plurality of business documents, and wherein the queue filter module forms a plurality of queue filters for segregating a set of transactions associated with the plurality of business documents based on the set of business rules, and wherein the exclusive queue module forms a plurality of queues based on the plurality of queue filters and at least one activity associated with the set of transactions, wherein forming the plurality of queues comprises:

attaching a service level agreement associated with the business process to a queue of the plurality of queues, wherein the service level agreement comprises a service level threshold; and generating an alert signal when a parameter for an activity associated with the queue is greater than the service level threshold, wherein the work allocation module determines a presence of overlapping between the plurality of queues, wherein determining the overlapping between the plurality of queues is based on:

$$F=[\Pi^q_{i=1}(1-|(B^p_i-B^c_i)|)]\times[\Pi^r_{i=1}(\Sigma^{r'}_{j=1}(D^p_{ij}\times D^c_{ij}))]\times[\Pi^s_{i=1}(\Sigma^{s'}_{j=1}(C^p_{ij}\times C^c_{ij}))],$$

with F indicating a final score, q indicating a maximum number of the data fields of binary nature, p and c indicating two respective queues being compared and refer to a previously formed queue and a currently formed queue respectively, r indicating a maximum number of the data fields of discrete nature, r' indicating a maximum number of classes formed within the data fields of discrete nature, s indicating a maximum number of the data fields of continuous nature, s' indicating a maximum number of blocks formed within each data field of continuous nature, $B_i$ refers to the data fields of binary nature, $D_{ij}$ refers to the data fields of discrete nature, $C_{ij}$ refers to the data fields of continuous nature, and wherein the classes and blocks define categories in the data fields of discrete nature and continuous nature respectively; and wherein the work allocation module assigns a list of agents for each of the plurality of queues.

* * * * *